United States Patent
Halsey

(10) Patent No.: US 11,181,817 B1
(45) Date of Patent: Nov. 23, 2021

(54) VERTICALLY AND CORNER-ORIENTED HIGH-DEFINITION PYLON-MOUNTED CAMERAS

(71) Applicant: Admiral Video, LLC., Lancaster, NY (US)

(72) Inventor: Paul M. Halsey, Lancaster, NY (US)

(73) Assignee: Admiral Video, LLC, Lancaster, NY (US)

( * ) Notice: Subject to any disclaimer, the term of this patent is extended or adjusted under 35 U.S.C. 154(b) by 0 days.

(21) Appl. No.: 16/870,469

(22) Filed: May 8, 2020

(51) Int. Cl.
| | | |
|---|---|---|
| G03B 37/04 | (2021.01) | |
| G03B 17/56 | (2021.01) | |
| H04N 5/225 | (2006.01) | |
| A63B 71/02 | (2006.01) | |

(52) U.S. Cl.
CPC ............ *G03B 37/04* (2013.01); *A63B 71/023* (2013.01); *G03B 17/561* (2013.01); *H04N 5/2253* (2013.01); *H04N 5/2254* (2013.01); *A63B 2243/007* (2013.01)

(58) Field of Classification Search
None
See application file for complete search history.

(56) References Cited

U.S. PATENT DOCUMENTS

| | | | |
|---|---|---|---|
| 5,190,256 | A | 3/1993 | Macchiarella |
| 5,493,331 | A | 2/1996 | Takahashi et al. |
| D586,837 | S | 2/2009 | McCoin |
| D746,350 | S | 12/2015 | Li |
| 9,442,464 | B2 | 9/2016 | Singleton |
| D776,740 | S | 1/2017 | Okawa |
| D781,361 | S | 3/2017 | Dimitriadis et al. |
| 9,817,299 | B2 * | 11/2017 | Halsey ............... H04N 5/2251 |
| 10,139,709 | B2 * | 11/2018 | Halsey ............... G03B 37/00 |
| 10,394,108 | B2 | 8/2019 | Halsey et al. |
| 2004/0239759 | A1 * | 12/2004 | Wickramaratna ...... H04N 7/181 348/61 |
| 2005/0162545 | A1 * | 7/2005 | Jeon ................. H04N 5/2252 348/373 |
| 2008/0232061 | A1 | 9/2008 | Wang et al. |

(Continued)

FOREIGN PATENT DOCUMENTS

| | | |
|---|---|---|
| EP | 1911499 A2 | 4/2008 |
| GB | 2539837 A | 12/2016 |
| JP | 2011130824 A | 7/2011 |

OTHER PUBLICATIONS

U.S. Appl. No. 16/683,110, filed Nov. 13, 2019; Inventor: Paul M. Halsey.

*Primary Examiner* — William B Perkey
(74) *Attorney, Agent, or Firm* — Simpson & Simpson, PLLC

(57) ABSTRACT

A pylon-mounted camera assembly, comprising a pylon, the pylon comprising a first face, a second face, a third face and a fourth face, the first fact adjacent to the second face such that the first and second faces form a first corner, the third face adjacent to the fourth face such that the third and fourth faces form a second corner, wherein a diagonal axis intersects the first and second corners; a first aperture at least partially embedded within the first corner of the pylon; and, a first camera adjustably positioned within the first aperture, the first camera facing upwardly, the first camera comprising an optical axis wherein the optical axis is adjustably arranged to intersect the diagonal axis of the pylon.

13 Claims, 18 Drawing Sheets

(56) References Cited

U.S. PATENT DOCUMENTS

| | | |
|---|---|---|
| 2012/0242837 A1* | 9/2012 | Sasagawa ............ H04N 5/2258 |
| | | 348/159 |
| 2014/0063260 A1 | 3/2014 | Bender et al. |
| 2014/0247324 A1 | 9/2014 | Cury et al. |
| 2015/0202517 A1 | 7/2015 | Jacobson et al. |
| 2016/0279498 A1 | 9/2016 | Gordon et al. |
| 2016/0330362 A1 | 11/2016 | Singleton |
| 2016/0346690 A1 | 12/2016 | Ramachandran |
| 2017/0039671 A1 | 2/2017 | Seo et al. |
| 2017/0056721 A1 | 3/2017 | Stelfox et al. |

\* cited by examiner

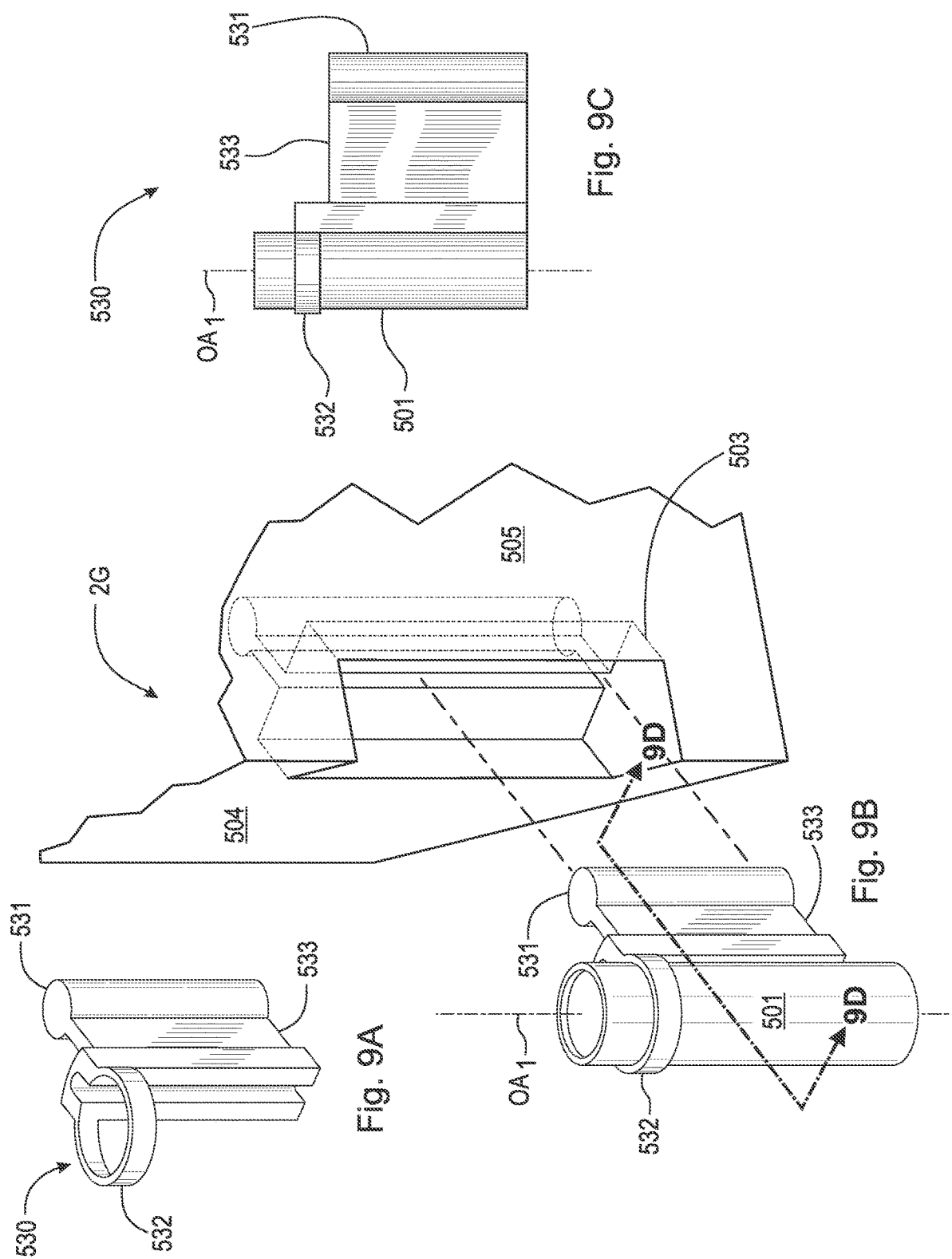

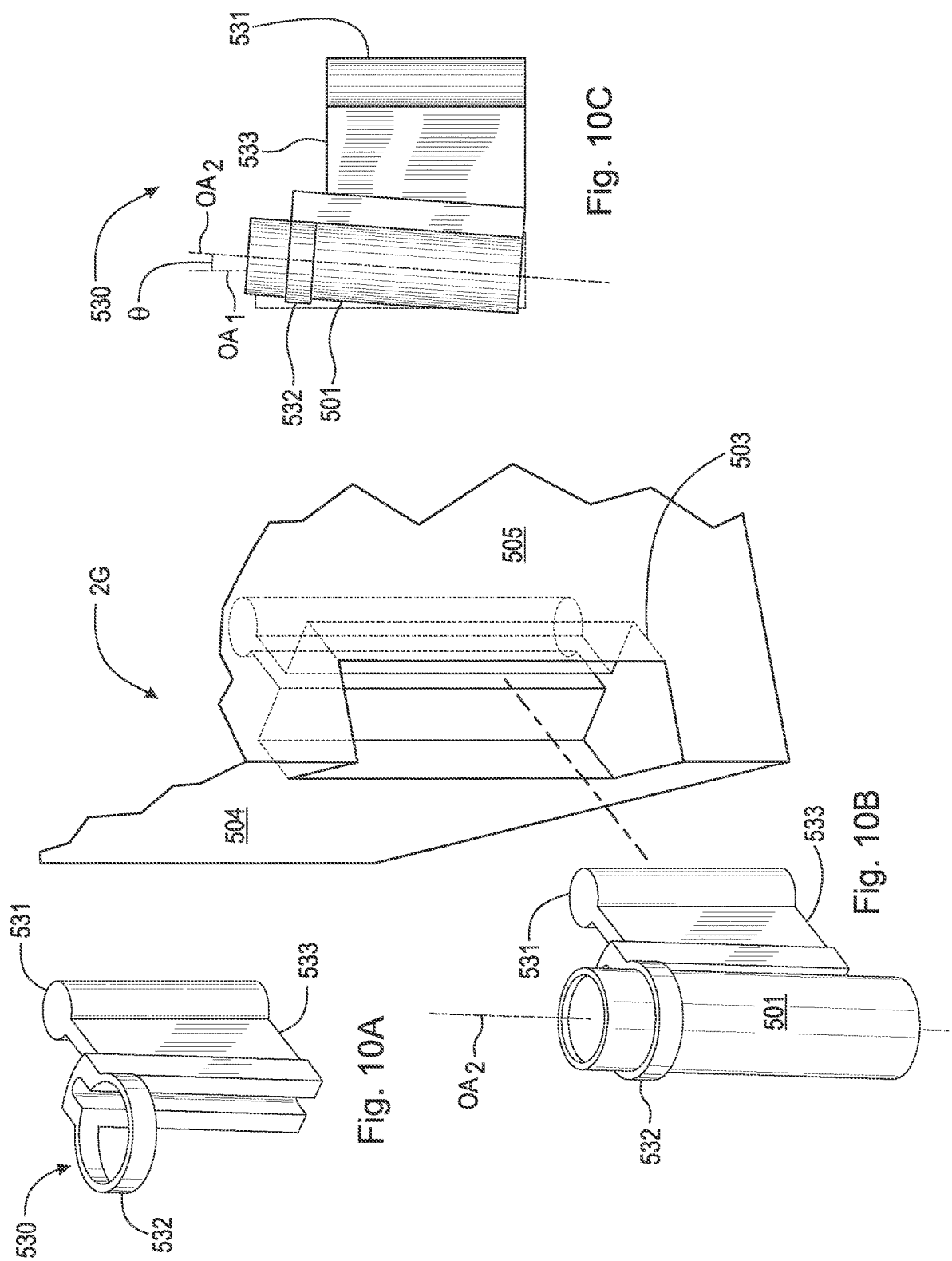

VERTICALLY AND CORNER-ORIENTED HIGH-DEFINITION PYLON-MOUNTED CAMERAS

CROSS-REFERENCE TO RELATED APPLICATIONS

This application incorporates by reference in their entirety the following United States Patents: U.S. Pat. No. 9,817, 299, issued on Nov. 14, 2017; U.S. Pat. No. 10,139,709, issued Nov. 27, 2018; and U.S. Pat. No. 10,394,108, issued on Aug. 27, 2019. This application also incorporates in its entirety U.S. Broadened Reissue patent application Ser. No. 16/683,110, filed on Nov. 13, 2019.

FIELD

The present disclosure relates generally to cameras, more particularly, to cameras mounted within a pylon used on an American football field, and, even more particularly, to cameras mounted along a substantially vertical axis on a pylon, with a skyward view.

BACKGROUND

Football is a game of inches. A mere inch can be the difference between a game-winning touchdown and defeat. The NFL Rulebook states a touchdown is scored "if any part of the ball is on, above, or behind the opponent's goal line while legally in possession of an inbounds player, provided it is not a touchback." Therefore, it is of the utmost importance for game officials and the audience watching on television to have the best view possible of the goal line and sideline area proximate the goal line. Reputations, glory, and money are at stake whenever an official makes a call on the field. Over the years, the National Football League, National Collegiate Athletic Association, and other professional and amateur football leagues have attempted to eliminate as many officiating errors as possible through the use of video instant replay.

The National Football League first experimented with instant replay in 1976 when Art McNally, then the director of officiating, wanted to find out how long a video review would delay a game. However, the League viewed instant replay at that point to be too costly and inefficient, and shelved instant replay until the mid-1980s.

In 1985, the National Football League began experimenting again with instant replay, adopting a rule that allowed each team to challenge an official's ruling on two plays per game. When a play is challenged, an official reviews all available video footage of the play in question to decide whether the call on the field should stand. This effective rule change helped improve officiating throughout the National Football League. Over the years, the rules regarding instant replay have changed, leading to an increased emphasis on the strategic element of challenging on-field rulings by officials. Some of these rule changes in the National Football League include mandatory reviews of each scoring play, each turnover, and every play after the two-minute warning of each half.

Today, instant replay has become a necessity for challenged plays, and television audiences have become accustomed to being able to relive and critique every play immediately after an official blows his whistle. Officials and viewers desire the most accurate, clear, and definitive view of each play, particularly when a touchdown is scored. It is desirable to have as accurate a view of the goal line and sidelines as possible to determine if the ball has crossed the plane of the goal line, if a player with possession of the ball should be considered down, if a player carried the ball out of bounds before reaching the goal line, or if a player successfully caught a ball with both feet down in the end zone, to name a few situations.

U.S. Patent Application Publication No. 2014/0063260 (Bender et al.) discloses a video replay system constructed within a cuboid end zone pylon. Bender et al. teach a pylon comprising three high-definition cameras, one placed on the face of the pylon facing the goal line, and one on each face directed toward the sideline. This camera orientation is disadvantageous because each camera can only see down either the goal line, in the case of the camera facing the goal line, or each sideline, in the case of the cameras facing the sidelines, and it is desirable to be able to see where the goal line and sideline intersect to determine whether a touchdown has been scored. Bender et al. further teaches wireless transmission of video signals, which has been shown to be disadvantageous within an end zone pylon.

U.S. Pat. No. 9,817,299 (the '299 patent) discloses a pylon-mounted camera assembly having a wired connection. The wired connection is more advantageous than the wireless transmission of video signals because when a stadium filled with people and their respective technology is present, there is simply too much interference to provide consistent reliable video signals. The '299 patent teaches wiring that extends internally through the pylon to a wired stationary turf base. The base allows for quick and accurate mating of the two so that upon impact during play, the pylon-mounted camera assembly can be easily reconnected. The breakaway wired connection allows for physical impact during play and avoids the interference problem which accompanies wireless transmission.

U.S. Pat. No. 10,139,709 (the '709 patent) discloses a corner-oriented pylon-mounted camera assembly. The pylon includes two apertures in the body which house a camera each such that the lenses are facing outward from the pylon. The apertures are centered about the corners of the pylon such that the field of view of both cameras includes the goal line, the sideline, the endzone and the field of play. The '709 patented invention is an improvement of the '299 patented invention, and the invention of Bender et al. because the field of view of the corner-oriented cameras show multiple important parts of the field (the sideline and the goal line) whereas the cameras disclosed by Bender et al. and the '299 patent only show one (just the goal line or just the sideline). Additionally, the '709 patent discloses a third camera arranged to pass through one of the faces of the pylon.

U.S. Pat. No. 10,394,108 (the '108 patent) also discloses a corner-oriented pylon-mounted camera assembly, however, the '108 patent discloses a pylon-mounted camera assembly having apertures centered about the corner of the pylon, cameras positioned within said apertures, facing outwardly from the pylon but without a third camera arranged to pass through one of the faces of the pylon.

The above-identified patented inventions solve some, but not all, of the problems associated with determining whether a football player has scored a touchdown in a game, i.e., in assisting the referee to determine if the ball has crossed the plane of the goal line. However, at least one problem remains unsolved by the prior art inventions. According to NFL Rule 11, Section 2, Article 1(b), "A touchdown is scored when: a ball in possession of an airborne runner is on, above, or behind the plane of the goal line, and some part of the ball passed over or inside the pylon." Thus, it is critical to be able to determine if the football intersects the airspace above the pylon. For example, it is possible that a player will hold the ball in the airspace directly above the pylon, which itself is outside the boundaries of the playing field. Should this happen, and assuming the player himself is still inbounds when this happens, this is ruled a touchdown. Heretofore, however, no pylon-mounted camera has been able to capture this event with the particular specificity needed—the view of a football traversing part of the airspace directly above a pylon.

Thus, there is a long-felt need for an end zone pylon having a camera vertically-oriented and capable of viewing at least part of the airspace directly above the pylon, and specifically configured to view part of the pylon which borders the goal line.

SUMMARY

According to aspects illustrated herein, there is provided a pylon-mounted camera assembly, comprising a pylon, the pylon comprising a first face, a second face, a third face and a fourth face, the first face adjacent to the second face such that the first and second faces form a first corner, the third face adjacent to the fourth face such that the third and fourth faces form a second corner, wherein a diagonal axis intersects the first and second corners; a first aperture at least partially embedded within the first corner of the pylon; and, a first camera positioned within the first aperture, the first camera facing upwardly, the first camera comprising an optical axis wherein the optical axis is arranged to intersect the diagonal axis of the pylon.

A primary object is to provide a pylon-mounted camera assembly which can be used during football games to provide an improved video replay of any scoring plays, and especially those scoring plays that are difficult to assess on-field by a referee, or those which are in dispute.

Another primary object is to provide an end zone pylon having a camera vertically-oriented and capable of viewing at least part of the airspace directly above the pylon, and specifically configured to view part of the pylon which borders the goal line.

A further object is to provide a pylon-mounted camera assembly which complies with the National Football League's and/or the National Collegiate Athletic Association's safety rules.

Still another object is to provide a pylon-mounted camera assembly that is hard-wired and able to transmit video with a reduced latency period compared to existing wireless pylon-mounted cameras.

Yet another object is to provide a pylon-mounted camera assembly that provides high-definition video.

Another object is to provide a pylon-mounted camera assembly that is able to, with one camera, visualize a football field's sideline and goal line simultaneously with a wide-angle lens.

Another object is to provide a pylon-mounted camera assembly with cameras located at the corners of the pylon facing the field of play.

Another object is to provide a pylon/camera assembly with a first camera arranged about a first optical axis and a second camera arranged about a second optical axis, where the first optical axis and second optical axis are substantially orthogonal to one another.

Another object is to provide a pylon-mounted camera assembly with cameras to located at the corners of the pylon facing the field of play where both cameras have a field of view greater than 90 degrees, and may simultaneously view both the goal line and sideline.

Yet another object is to provide a pylon-mounted camera assembly to be used on a football field wherein the side of the pylon facing the goal line comprises a camera.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 9A is a perspective view of camera mount 530 of a first preferred embodiment as shown in FIG. 8;

FIG. 9B is a fragmentary exploded view of pylon-mounted camera assembly 2G of the first preferred embodiment as shown in FIG. 5A;

FIG. 9C is side view of camera mount 530 and camera 501 of the first preferred embodiment as shown in FIG. 9B;

FIG. 10A is a perspective view of camera mount 530 of a second preferred embodiment;

FIG. 10B is a fragmentary exploded view of pylon-mounted camera assembly 2G of the second preferred embodiment;

FIG. 10C is a side view of camera mount 530 and camera 501 of the second preferred embodiment as shown in FIG. 10B;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value. The term "corner" is intended to mean the place where two sides or faces of the pylon meet, and the place where two boundary lines meet on a football field.

It should be understood that, in the event there exists a discrepancy between the reference numbers recited in this patent and those recited in prior patents incorporated herein by reference, the reference numbers recited in this patent shall take precedence and apply in interpreting the claims herein.

Figure 1:
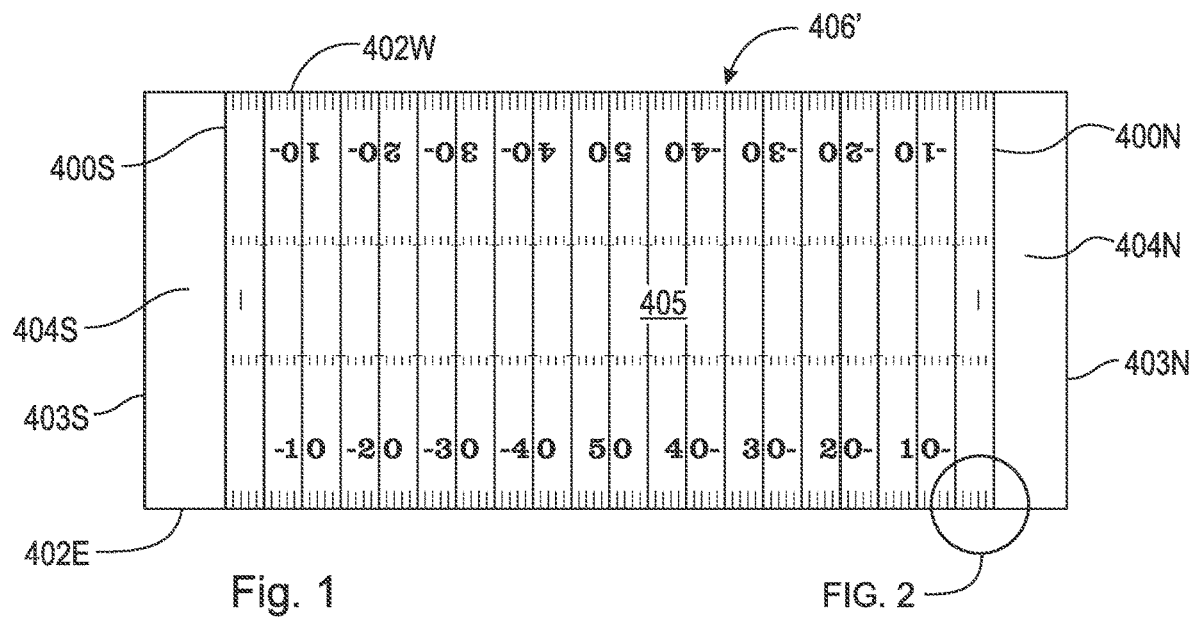
FIG. 1 is a top view of an exemplary football field.

Adverting now to the Figures, FIG. 1 is a top view of traditional American football field 406'. As is well known, a traditional American football field is 100 yards long, 53.33 yards (160 feet) wide, and includes a 10 yard end zone at each end having the same width as the playing field. These are standard dimensions of fields used in the NFL and in college football (NCAA). (It should be mentioned that although the present invention is illustrated relative to an American football field that the invention is not limited to use in association with football. Variations of the invention could find use in other sports and games as well, such as soccer, rugby and the like.) Football field 406' comprises field of play 405, north endzone 404N and south endzone 404S, east sideline 402E and west sideline 402W, north end line 403N and south endline 403S, and north goal line 400N and south goal line 400S. Field of play 405 comprises the area between goal lines 400N and 400S and sidelines 402E and 402W. Traditionally, but not pictured in FIG. 1, eight pylons are positioned at the corners of endzones 404N and 404S, one at each corner, with at least one corner of the pylon intersecting the two boundaries which define that corner, specifically the intersection of goal lines 400N and 400S with sidelines 402E and 402W for the front corners of endzones 404N and 404S, and the intersection of end lines 403N and 403S with sidelines 402E and 402W for the back corners of endzones 404N and 404S.

Figure 2:
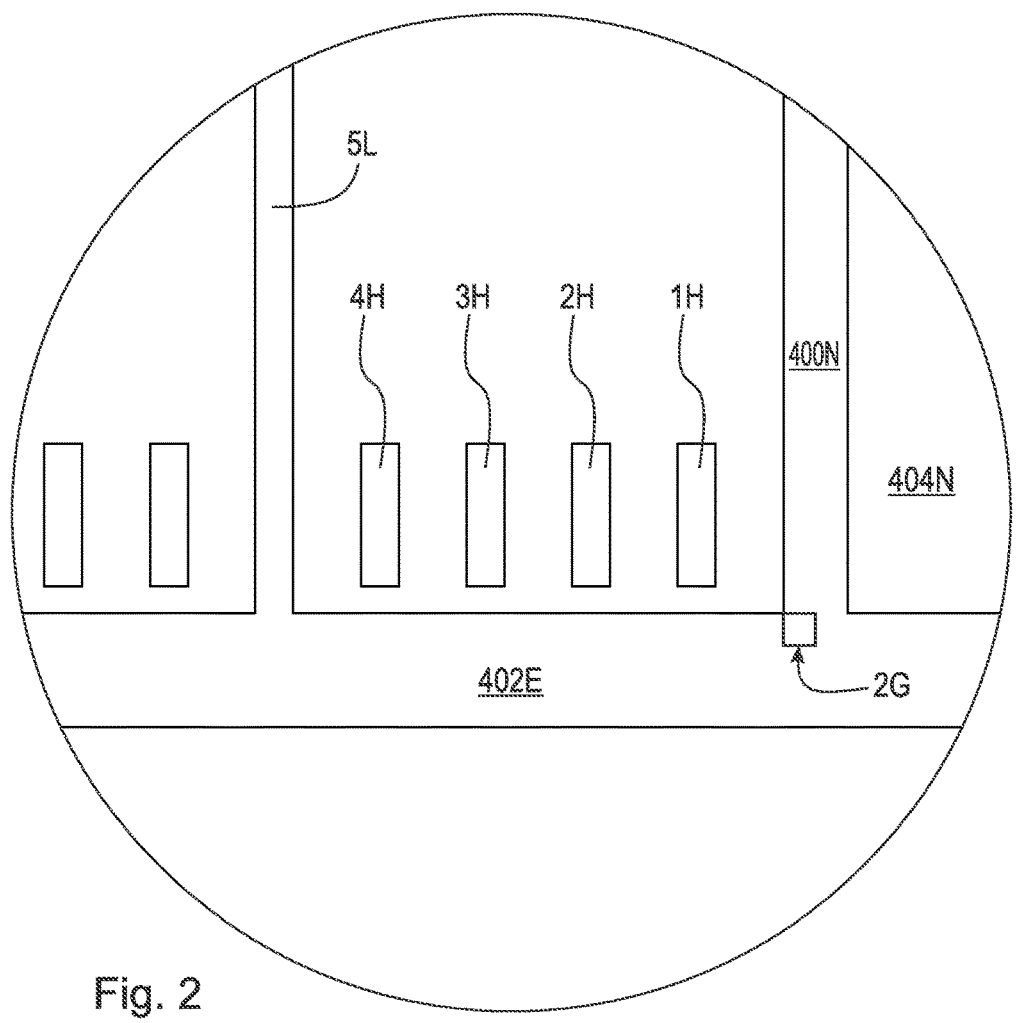
FIG. 2 is an enlarged view of the area labeled FIG. 2 in FIG. 1.

FIG. 2 is an enlarged top view of the area of football field 406' taken generally at the encircled area labeled FIG. 2 in FIG. 1, illustrating where field of play 405, sideline 402E, goal line 400N, and endzone 404N meet. Pylon-mounted camera assembly 2G is positioned such that one corner of pylon-mounted camera assembly 2G is positioned at the intersection of sideline 402E and goal line 400N, at the front corner of endzone 404N. Notably, pylon-mounted camera assembly 2G is positioned substantially out of bounds. Importantly, however, while pylon-mounted camera assembly 2G may be positioned substantially out of bounds, pursuant to NFL Rule 11, Section 2, Article 1(b), pylon-mounted camera assembly 2G, and the area directly above it, may be considered in bounds, and as part of endzone 404N, in certain circumstances. For example, as illustrated in further drawings and described in more detail infra, if a player is running with the ball in his possession, dives for pylon-mounted camera assembly 2G from field of play 405, extends his arms, reaches for pylon-mounted camera assembly 2G with the ball still in his possession, and any portion of the ball touches pylon-mounted camera assembly 2G or passes through the area directly above pylon-mounted camera assembly 2G, it should be ruled a touchdown by an official. (It is most likely that a field judge and side judge would rule on a touchdown in the vicinity of the pylon during a football game.) For further reference, FIG. 2 shows hashmark 1H, 2H, 3H, and 4H and five-yard line 5L to indicate various positions on field 406'.

Figure 3:
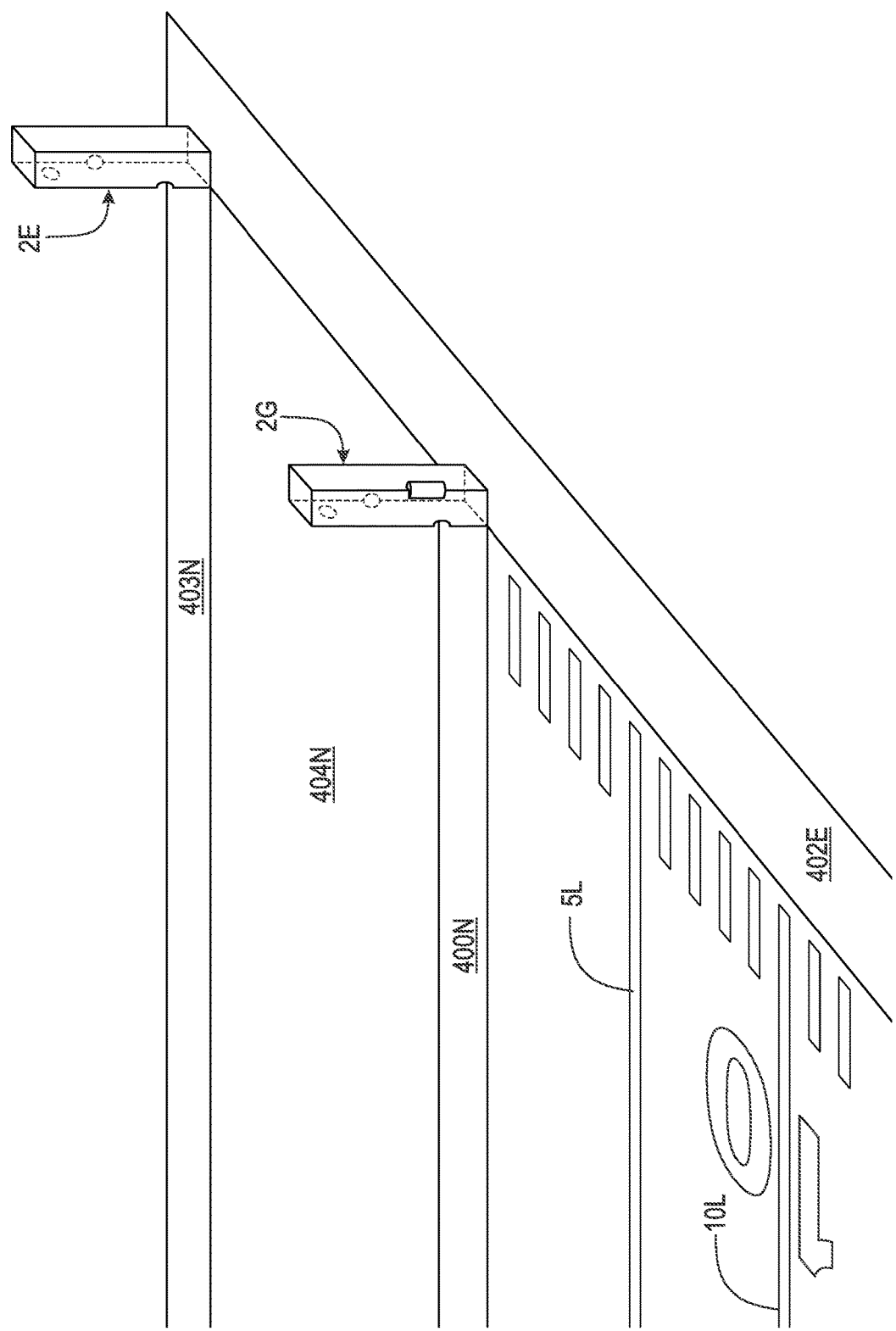
FIG. 3 is a perspective view of a corner of the football field shown in FIG. 1, showing the pylon-mounted camera assembly 2G of the present invention positioned at the intersection of the goal line and the sideline, and a second pylon-mounted camera assembly 2E positioned at the intersection of the end line of the end zone and the sideline.

FIG. 3 is a perspective view of a corner of football field 406'. Pylon-mounted camera assembly 2G is positioned such that one corner of pylon-mounted camera assembly 2G is positioned at the intersection of goal line 400N and sideline 402E. Pylon-mounted camera assembly 2E is positioned such that one corner of pylon-mounted camera assembly 2E is positioned at the intersection of sideline 402E and end line 403N. Pylon-mounted camera assemblies 2G and 2E give reference points to players, officials, and fans during gameplay. Pylon-mounted camera assemblies 2G and 2E mark the front-right and back-right corners of endzone 404N, respectively. For further reference, FIG. 3 shows ten-yard line 10L and five-yard line 5L to indicate the position on field 406'.

Figure 4:
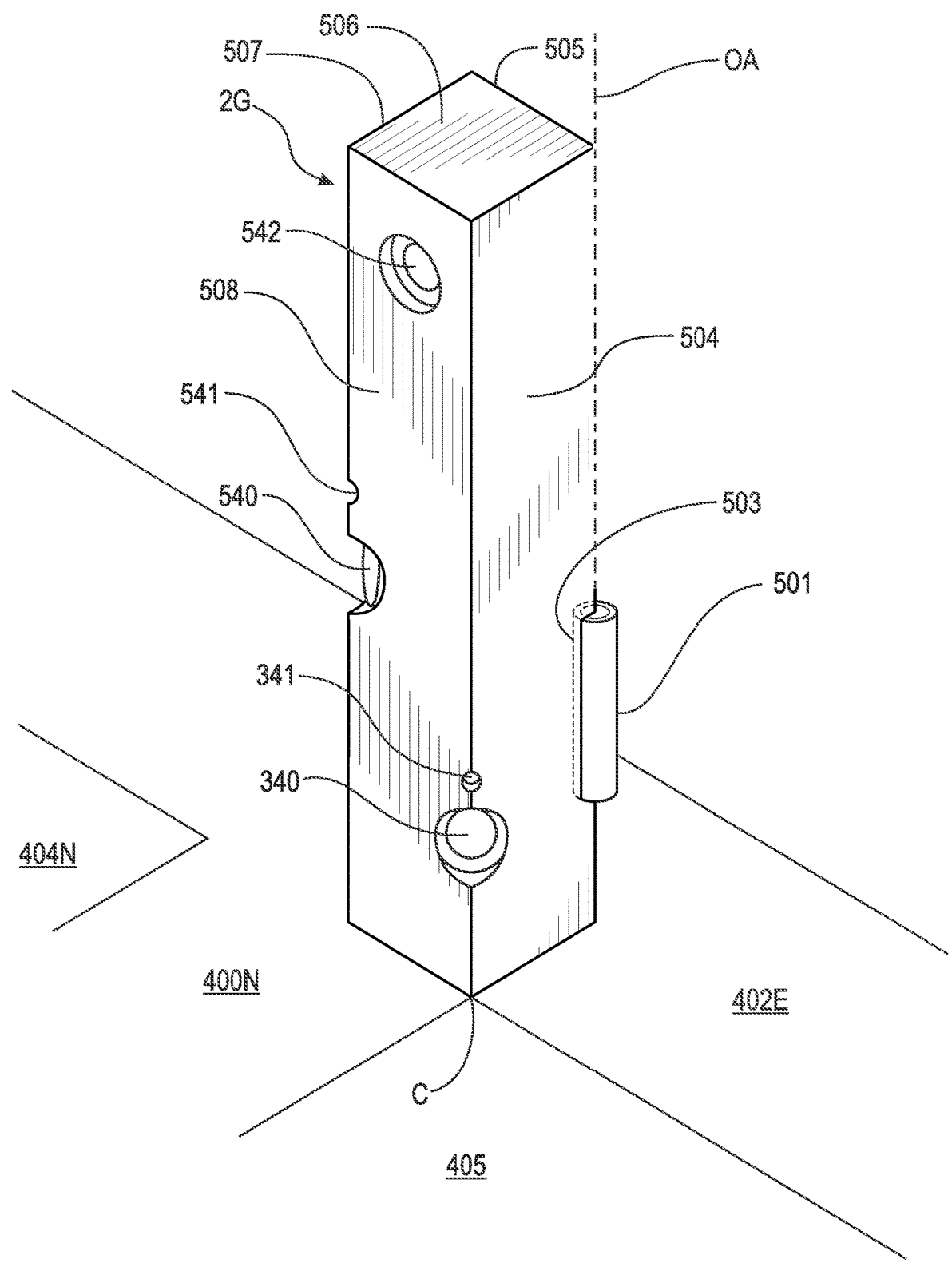
FIG. 4 is a front perspective view of pylon-mounted camera assembly 2G positioned at the intersection of the goal line and the sideline.

FIG. 4 is a front perspective view of pylon-mounted camera assembly 2G positioned such that corner C of pylon-mounted camera assembly 2G is positioned at the intersection of goal line 400N and sideline 402E. FIG. 4 shows pylon-mounted camera assembly 2G comprising first side face 504, second side face 505, third side face 507, fourth side face 508, top face 506, cameras 340, 540, 542, and 501, microphones 341 and 541, and aperture ix) 503. Camera 340 is positioned about the corner of pylon-mounted camera assembly 2G which is formed by side faces 504 and 508 and is operatively arranged to view portions of sideline 402E, field of play 405, goal line 400N and endzone 404N simultaneously. Camera 540 is positioned about the corner of pylon-mounted camera assembly 2G which is formed by side faces 507 and 508 and is operatively arranged to view portions of sideline 402E, endzone 404N, goal line 400N, and field of play 405 simultaneously. Camera 542 is positioned such that the optical axis of camera 542 is substantially parallel to goal line 400N and is operatively arranged to view portions of field of play 405, goal line 400N, and endzone 404N. Camera 501 is positioned at least partially within aperture 503 which is positioned about the corner of pylon-mounted camera assembly 2G formed by side faces 504 and 505. Camera 501 is further positioned substantially vertical such that the lens of camera 501 is facing skyward. In a preferred embodiment, optical axis OA of camera 501 is substantially parallel to the corner formed by faces 504 and 505 and is spaced apart from said corner such that optical axis OA does not intersect pylon-mounted camera assembly 2G at any point. In the preferred embodiment, the field of view of camera 501 is interrupted by pylon-mounted camera assembly 2G such that the airspace directly above pylon-mounted camera assembly 2G, is not visible, meaning any object, or any portion of any object, located directly above pylon-mounted camera assembly 2G will not be visible for that time it is located directly above pylon-mounted camera assembly 2G. (This obstruction of the field of view of camera 501 is illustrated infra.)

Figure 5A:
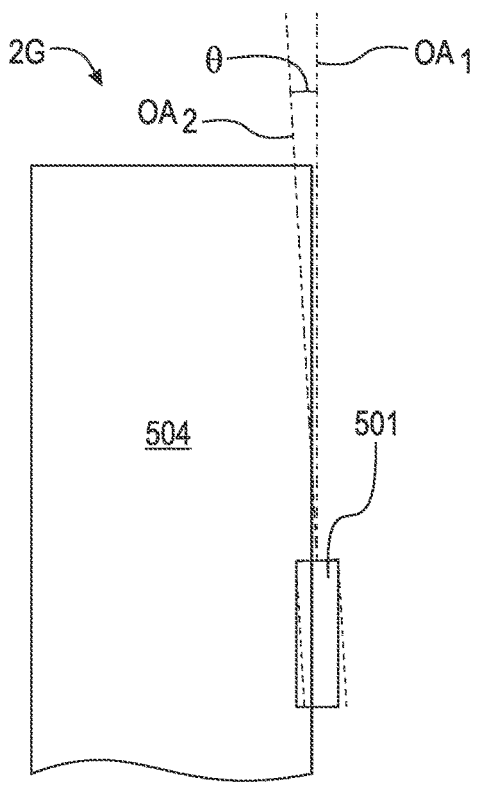
FIG. 5A is a fragmentary side view of pylon-mounted camera assembly 2G shown in FIG. 4, illustrating vertically mounted camera 501.

FIG. 5A is a fragmentary side view of pylon-mounted camera assembly 2G. FIG. 5A shows the adjustability of camera 501. In a first preferred embodiment, camera 501 is positioned such that optical axis $OA_1$ is parallel to first corner A (labelled in FIGS. 5C and 5D) of pylon-mounted camera assembly 2G which is formed by side faces 504 and 505 (shown in FIGS. 5B-5C) and is spaced apart from that corner such that $OA_1$ does not intersect pylon-mounted camera assembly 2G at any point. In a second preferred embodiment, camera 501 may be mounted at an angle such that the bottom end of camera 501 is a distance further away from the pylon to create optical axis $OA_2$. In doing so, optical axis $OA_2$ is formed if camera 501 is mounted at a different angle relative to the pylon. Optical axis $OA_2$ will then be positioned closer to pylon-mounted camera assembly 2G, eventually intersecting it. Angle θ represents the difference between optical axes $OA_1$ and $OA_2$. These two different possible positions of the mounting of camera 501 obviously affect the field of view of the camera. Positioning the bottom of camera 501 further away from pylon-mounted camera assembly 2G, such that its optical axis is in position $OA_2$, will cause more of the field of view to be interrupted by pylon-mounted camera assembly 2G compared to camera 501's position when its optical axis is in position $OA_1$.

Figure 5B:
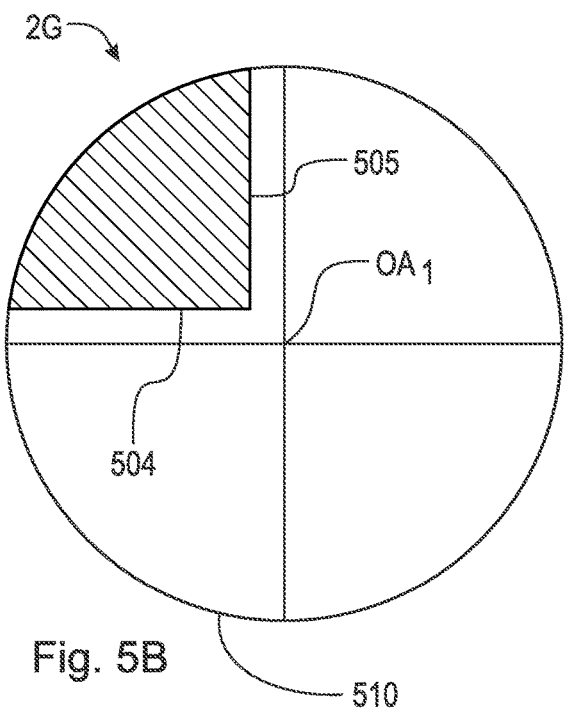
FIG. 5B is a fragmentary top view of pylon-mounted camera assembly 2G as shown in FIG. 5A, illustrating lens 510 of camera 501.

FIG. 5B is a fragmentary top view of camera lens 510 of vertical camera 501 when assembled in pylon-mounted camera assembly 2G. FIG. 5B shows camera 501 in a preferred embodiment such that optical axis $OA_1$ is substantially parallel to the corner of pylon-mounted camera assembly 2G formed by side faces 504 and 505. Pylon-mounted camera assembly 2G significantly interrupts the field of view of camera 501 such that anything directly above pylon-mounted camera assembly 2G is not visible in the field of view of camera 501.

Figure 5C:
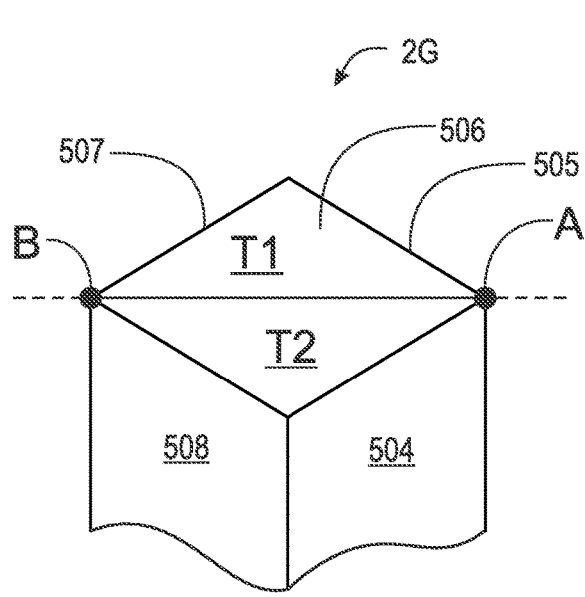
FIG. 5C is a fragmentary top perspective view of pylon-mounted camera assembly 2G as shown in FIG. 5B.

FIG. 5C is a fragmentary top perspective view of pylon-mounted camera assembly 2G. First corner A is formed by the intersection of side faces 504 and 505. Similarly, second corner B is formed by the intersection of side faces 507 and 508. Diagonal axis $D_{AB}$ joins corners A and B, and forms triangles T1 and T2.

Figure 5D:
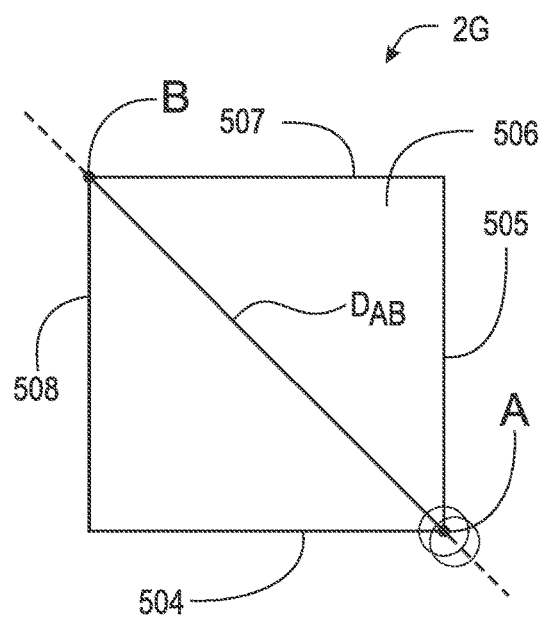
FIG. 5D is a top view of pylon-mounted camera assembly 2G as shown in FIG. 5A.

FIG. 5D is a top view of pylon-mounted camera assembly 2G. FIG. 5D shows diagonal axis $D_{AB}$ in relation to camera 501. In a preferred embodiment, camera 501 may be set in several different orientations and angles relative to the pylon, such that optical axis OA will always intersect diagonal axis $D_{AB}$, no matter if optical axis is in position $OA_2$ or $OA_1$.

Figure 6A:
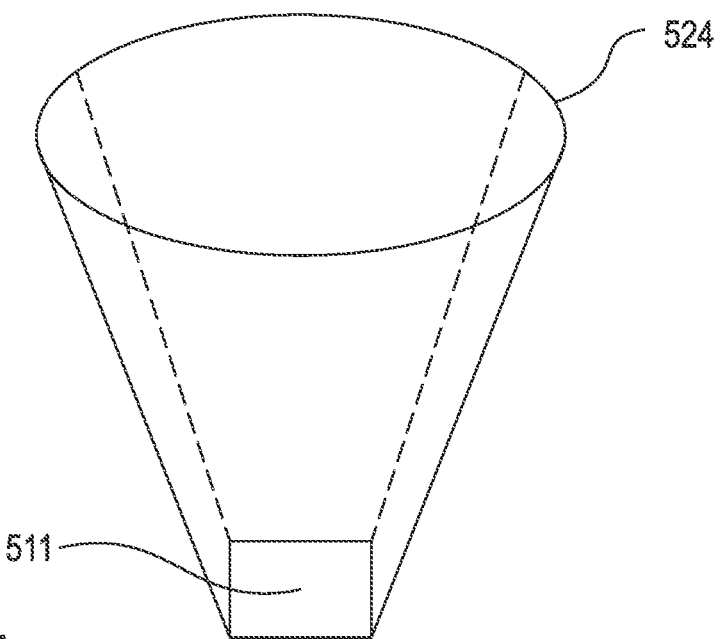
FIG. 6A is a schematic view illustrating the field of view of the sensor/lens of camera 501 as shown in FIG. 5A.

FIG. 6A is a schematic view illustrating the elliptical field of view 524 seen by the combination of sensor 511 and lens 510 of camera 501. Note that, in a preferred embodiment, field of view 524 is elliptical, while sensor 511 is substantially rectangular. Thus, in a preferred embodiment, sensor 511 crops the image received from field of view 524 from an ellipse to a rectangle with an aspect display ratio of 16:9. This 16:9 display is what is ultimately displayed on a high-definition broadcast. It should be noted that aspect ratio 16:9 is used in a preferred embodiment, but other aspect ratios and other field of view shapes may be used as well.

Figure 6B:
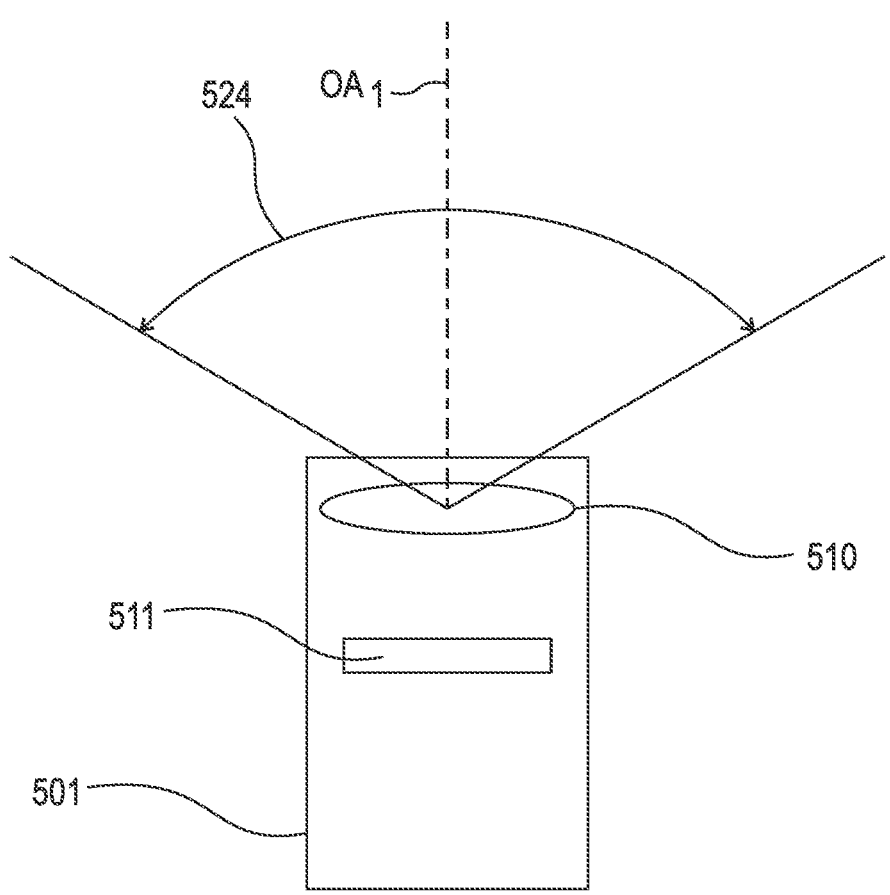
FIG. 6B is a side view further illustrating the field of view illustrated in FIG. 6A.

FIG. 6B is side view illustrating the field of view shown in FIG. 6A.

Figure 7:
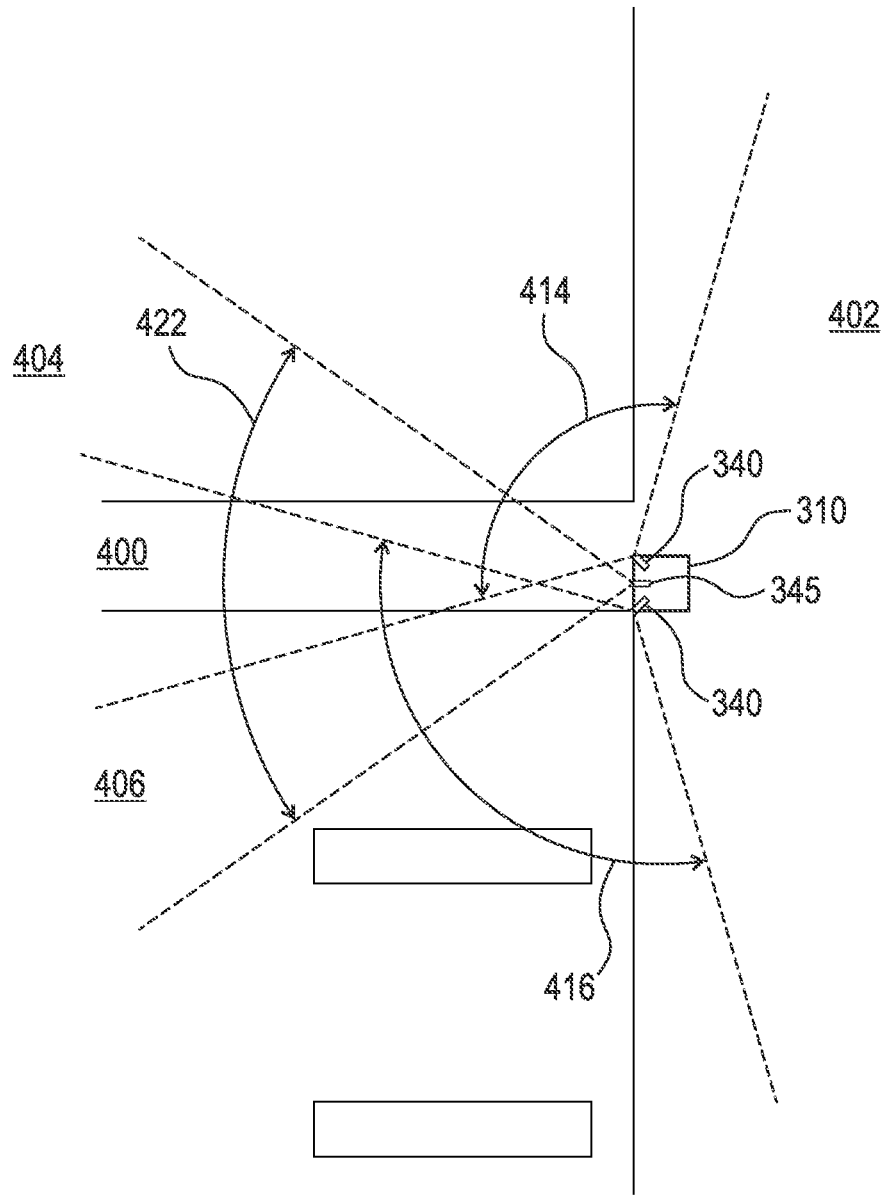
FIG. 7 is a top view of a pylon-mounted camera assembly of the prior art.

FIG. 7 is a top view of a pylon-mounted camera assembly of the prior art. The pylon 310 comprises three cameras, two corner-oriented cameras 340 and one goal line camera 345. Corner cameras 340 each have a field of view of approximately 122 degrees while goal line camera 345 has a significantly narrower field of view of approximately 70 degrees. Field of view 414 encompasses sideline 402, endzone 404, goal line 400, and field of play 406. Field of view 416 encompasses sideline 402, field of play 406, goal line 400, and endzone 404. Fields of view 414 and 416 overlap such that a portion of each field of view can be seen in the other. Even with the overlapping of 414 and 416, a crucial area of the field is not captured in fields of view 414 and 416. Field of view 422 encompasses most of the portion of the field not captured in 414 and 416, directly in front of camera 345. Another important aspect of field of view 422 is that it is significantly narrower. This allows for sharper images directly along goal line 400, which may be considered the must crucial area of the field. This may be needed as wider fields of view 414 and 416 do not provide the sharpest image along goal line 400, where inches or centimeters can be the difference between a touchdown or not. Even with the inclusion of camera 345 and field of view 422, a crucial area of the field is not captured: the area directly above the pylon.

This lack of camera coverage has caused major controversies and disputes in the NFL. As discussed above, pursuant to NFL Rule 11, Section 2, Article 1(b), the area directly above a pylon can be crucial in determining whether a touchdown has been scored. This was evident in Super Bowl LIV, when Damien Williams of the Kansas City Chiefs scored the go-ahead touchdown with 2:44 left in the game. Mr. Williams received a pass from quarterback Patrick Mahomes and dove toward the front-corner pylon, reaching for a touchdown. The play was ruled a touchdown, but, in the NFL, every scoring play undergoes replay review. While there was no conclusive evidence that Mr. Williams did in fact reach the ball over the top of the pylon, there was not conclusive evidence that he did not reach the ball over the top of the pylon either. Thus, pursuant to NFL rules, the original ruling on the field of touchdown could not be overturned, and the Kansas City Chiefs did, in fact, take the lead. Field of view 524 of camera 501 of the present invention (not shown in FIG. 7) would have captured this crucial area and resolved the issue.

Figure 8:
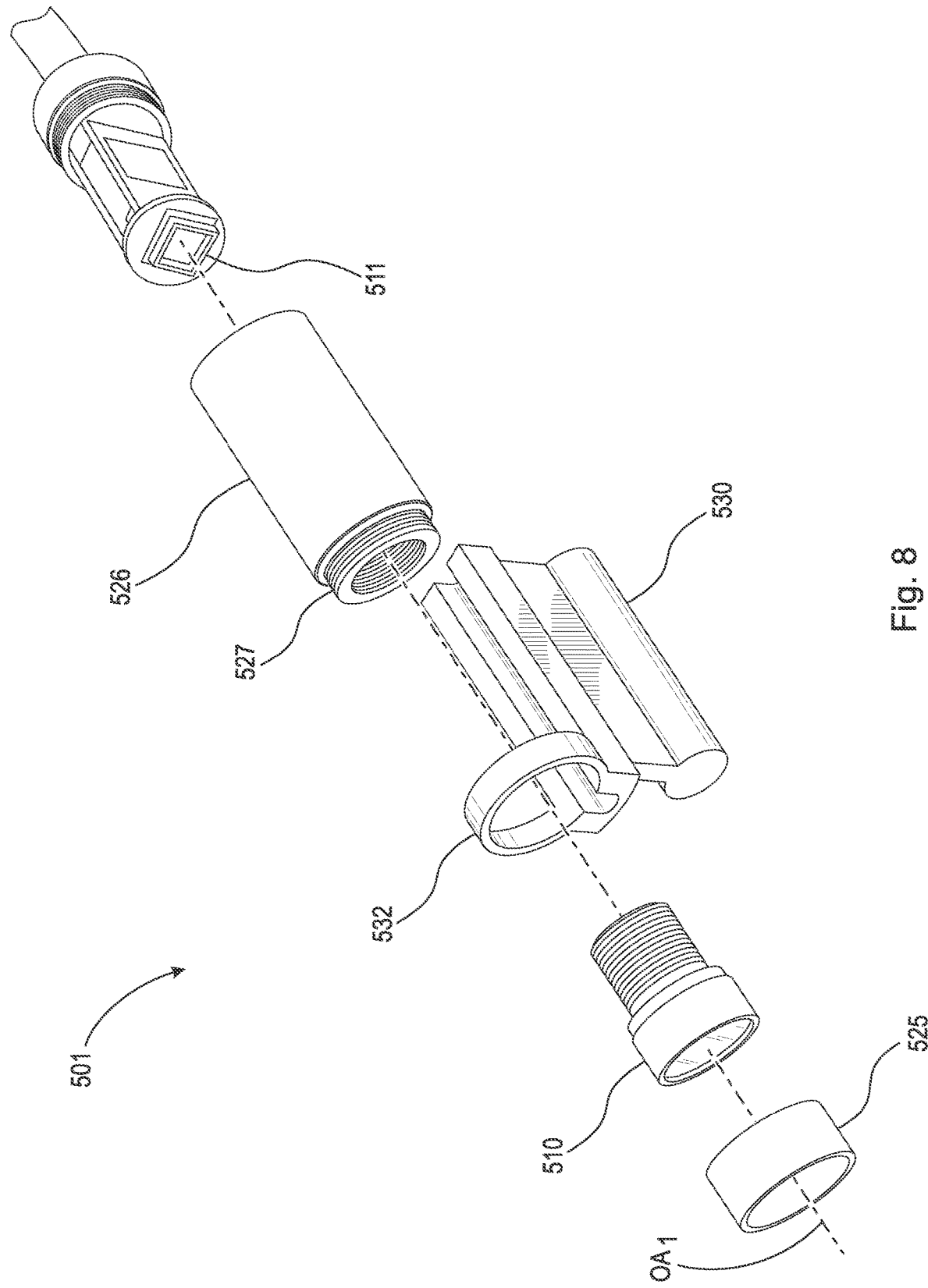
FIG. 8 is an exploded perspective view of camera 501 of the pylon-mounted camera assembly shown in FIG. 6B.

FIG. 8 is an exploded perspective view of camera 501 and camera mount 530 of pylon-mounted camera assembly 2G. In a preferred embodiment, camera 501 is a Marshall CV225-MB camera, but it should be appreciated that other models and other cameras may be used. Camera 501 comprises sensor 511, barrel 526, rim 527, lens guard 525, and lens 510. Sensor 511 and barrel 526 threadably engage one another, barrel 526 and lens 510 threadably engage one another, holder member 532 of mount 530 is operatively arranged such that the inner diameter is only slightly greater than the outer diameter of rim 527 so that it fits around rim 527, and holder 532 is then "sandwiched" between lens guard 525 and barrel 526, around rim 527, as lens guard 525 threadably engages rims 527. In a preferred embodiment, lens 510 is a RunCam RC21 FPV short Lens 2.1 mm FOV165 Wide Angle, but it should be appreciated that other camera lenses may be used.

FIG. 9A is a front perspective view of vertical camera mount 530 in a first preferred embodiment. Mount 530 comprises cylindrical member 531, holder member 532, and connector member 533. Cylindrical member 531 is significantly larger in width than connector member 533. Holder 532 is operatively arranged to receive and hold camera 501 such that rim 527 of camera 501 fits inside holder 532, but barrel 526 does not fit inside holder 532, and holder 532 is secured between barrel 526 and lens guard 525 when camera 501 is fully assembled. Mount 530 is operatively arranged to hold camera 501 in a substantially vertical position.

FIG. 9B is a fragmentary exploded right perspective view of pylon-mounted camera assembly 2G in a first preferred embodiment. Aperture 503 located at the corner of pylon-mounted camera assembly 2G formed by side faces 504 and 505 is shaped to fixedly secure mount 530 to pylon-mounted camera assembly 2G. Cylindrical member 531 is insertable into aperture 503 such that cylindrical member 531 must be forced through the thinner portion of aperture 503 and once fully inserted it "snaps" into place in the deepest portion of aperture 503, which portion is substantially the same shape as cylindrical member 531. Once snapped into place, mount 530 becomes substantially static such that camera 501 may capture usable images where optical axis $OA_1$ is substantially vertical and parallel to corner A formed by faces 504 and 505 and does not intersect pylon-mounted camera assembly 2G at any point.

FIG. 9C is a side view of mount 530 and camera 501 in a first preferred embodiment. Camera 501 is secured to mount 530 around rim 527 (shown in FIG. 8) via tightening threadably engaged rim 527 of barrel 526 (shown in FIG. 8) and lens guard 525 (shown in FIG. 8). Fully assembled, in this embodiment, $OA_1$ is substantially vertical and parallel to first corner A of pylon-mounted camera assembly 2G.

Figure 9D:
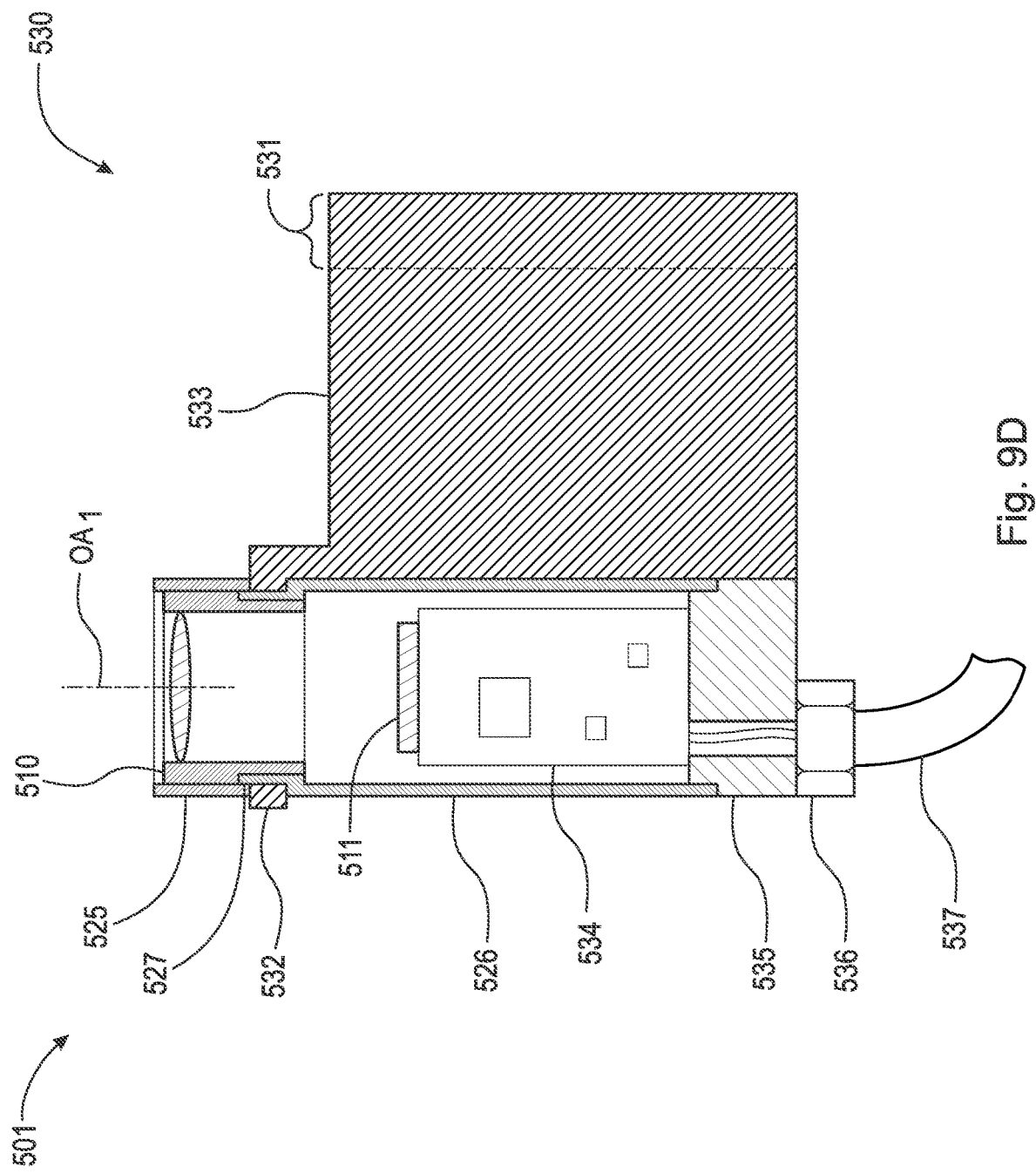
FIG. 9D is a cross-sectional view of camera mount 530 and camera 501 of the first preferred embodiment taken at line 9D of FIG. 9B.

FIG. 9D is a cross-sectional view of camera mount 530 and camera 501 of a first preferred embodiment taken at line 9D of FIG. 9B illustrating the mating of camera 501 and mount 530. Sensor 511 and barrel 526 threadably engage one another such that sensor 511 is positioned within barrel 526, barrel 526 and lens 510 threadably engage one another, holder member 532 of mount 530 is operatively arranged such that the inner diameter is only slightly greater than the outer diameter of rim 527 so that it fits around rim 527, and holder 532 is then "sandwiched" between lens guard 525 and barrel 526, around rim 527, as lens guard 525 threadably engages rim 527.

FIG. 10A is a front perspective view of vertical camera mount 530 in a second preferred embodiment. In this second preferred embodiment, mount 530 is operatively arranged in substantially the same manner as the first preferred embodiment of FIG. 9A. However, mount 530 is not meant to hold camera 501 in a substantially vertical position, which alteration is more clearly shown in FIG. 10C.

FIG. 10B is a fragmentary exploded right perspective view of pylon-mounted camera assembly 2G in a second preferred embodiment. Mount 530 "snaps" into place within aperture 503 in exactly the same manner as the first embodiment of FIG. 9A. Once snapped into place, mount 530 becomes substantially static such that camera 501 may capture usable video. However, optical axis $OA_2$ is not substantially vertical in this embodiment and is operatively arranged to intersect pylon-mounted camera assembly 2G.

FIG. 10C is a side view of mount 530 and camera 501 in a second preferred embodiment. $OA_1$ is shown for reference where $OA_1$ is substantially vertical and $OA_2$ is operatively arranged in a different position such that the difference between $OA_1$ and $OA_2$ is represented by θ. While $OA_1$ is operatively arranged to be substantially parallel to the corner formed by side faces 504 and 505 of pylon-mounted camera assembly 2G and not intersect pylon-mounted camera assembly 2G, $OA_2$ is operatively arranged to intersect pylon-mounted camera assembly 2G. This slight difference in the position of camera 501 will adjust field of view 524 such that more of field of view 524 will be interrupted by pylon-mounted camera assembly 2G when camera 501 is positioned in agreement with $OA_2$ than when positioned in agreement with $OA_1$.

Figure 11:
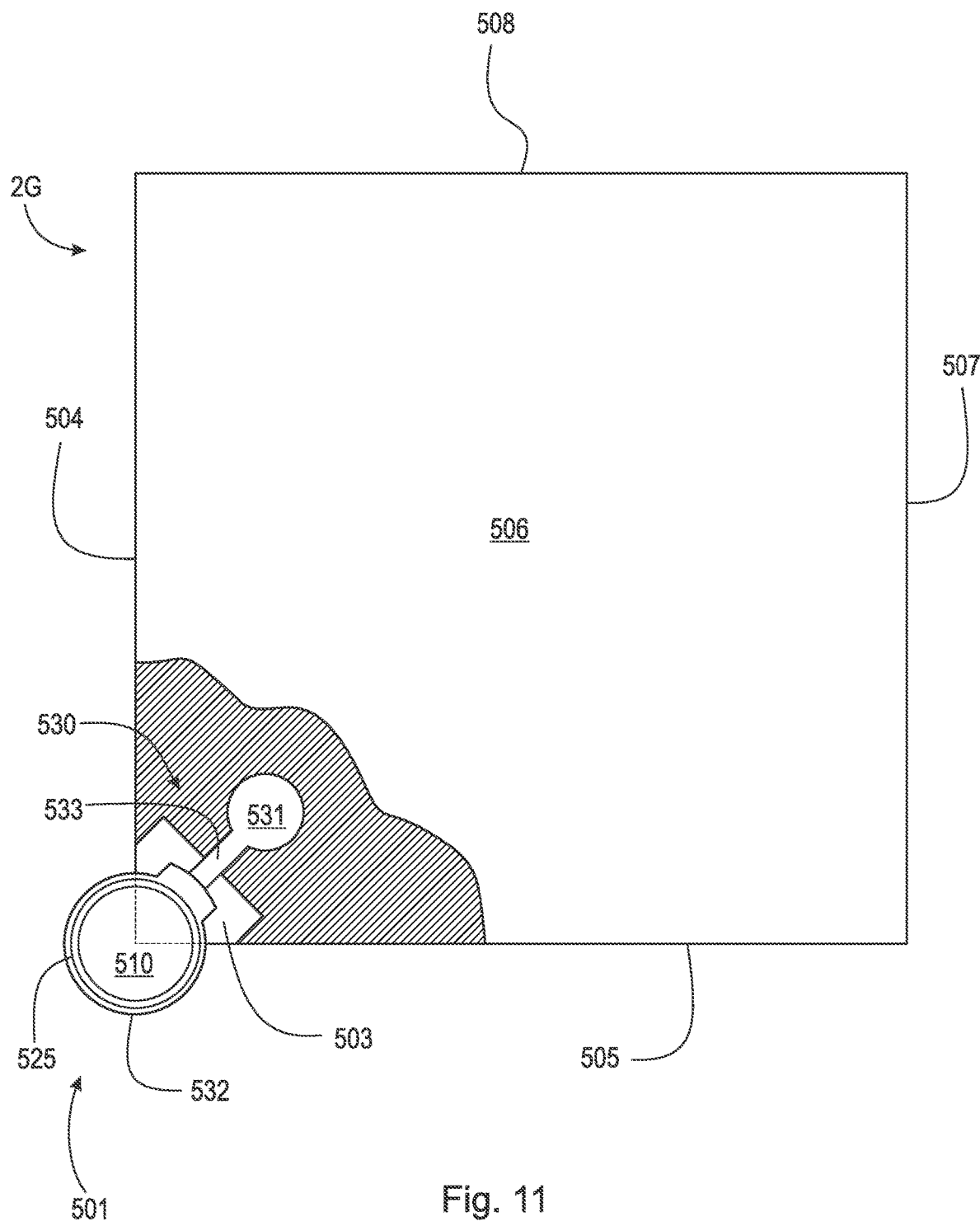
FIG. 11 is fragmentary top view of pylon-mounted camera assembly 2G.

FIG. 11 is a fragmentary top cut-away view of pylon-mounted camera assembly 2G fully assembled. Mount 530 is completely inserted in aperture 503 such that aperture 503 is not shown because mount 530 fills the aperture to its entirety. Cylindrical member 531 is inserted through the thinner section of aperture 503. Once fully inserted, mount 530 is locked into place such that mount 530 is substantially static.

Figure 12A:
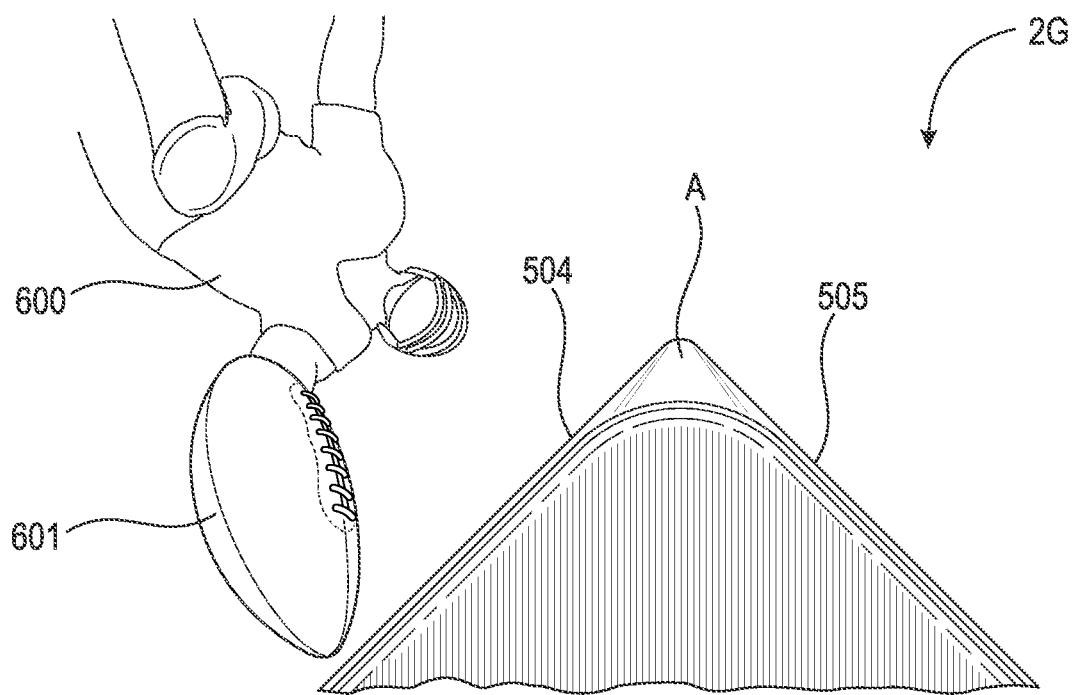
FIG. 12A is a representational display view of field of view 524.
Figure 12B:
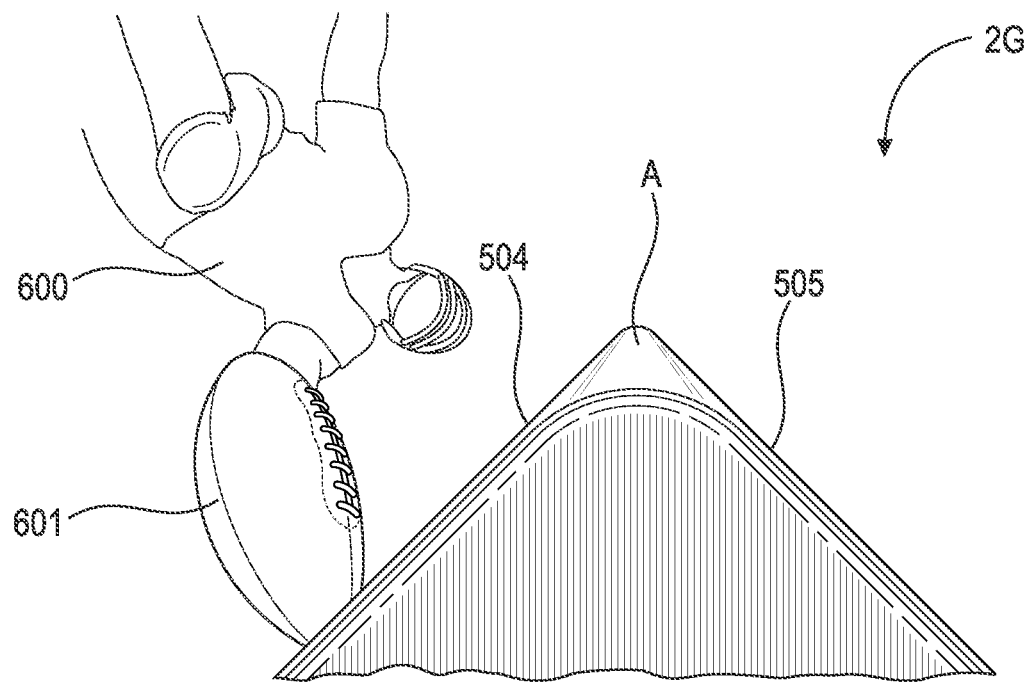
FIG. 12B is a representational display view of field of view 524.

FIGS. 12A and 12B are representational displays of what may be captured within fields of view 524 while pylon-mounted camera assembly 2G is in use (namely, a football player attempting to wave a football in the airspace above the pylon.) As described above, camera 501 is positioned about first corner A formed by side faces 504 and 505 of pylon-mounted camera assembly 2G. Camera 501 is positioned such that field of view 524 is partially interrupted by pylon-mounted camera assembly 2G. Field of view 524 is operatively arranged such that it is aligned substantially along the planes of faces 504 and 505 simultaneously. Side face 504 defines the plane of goal line 400N and side face 505 defines the plane of pylon-mounted camera assembly 2G which determines whether a football is in-bounds or out-of-bounds in certain circumstances conceptualized by NFL Rule 11. Thus, any object (such as a football) located directly above pylon-mounted camera assembly 2G will not appear in field of view 524 as pylon-mounted camera assembly 2G interferes. For example, player 600 dives toward pylon-mounted camera assembly 2G, reaching football 601 toward the area above pylon-mounted camera assembly 2G, however, as shown in FIG. 12A, football 601 has not yet crossed goal line 400N, and thus cannot be ruled a touchdown. However, in FIG. 12B football 601 has traversed goal line 400N and is partially located above pylon-mounted camera assembly 2G, and accordingly, a portion of football 601 cannot be seen as pylon-mounted camera assembly 2G interferes. The situation shown in FIG. 12B would be considered a touchdown, while the situation shown in FIG. 12A would not be considered a touchdown.

Figure 13A:
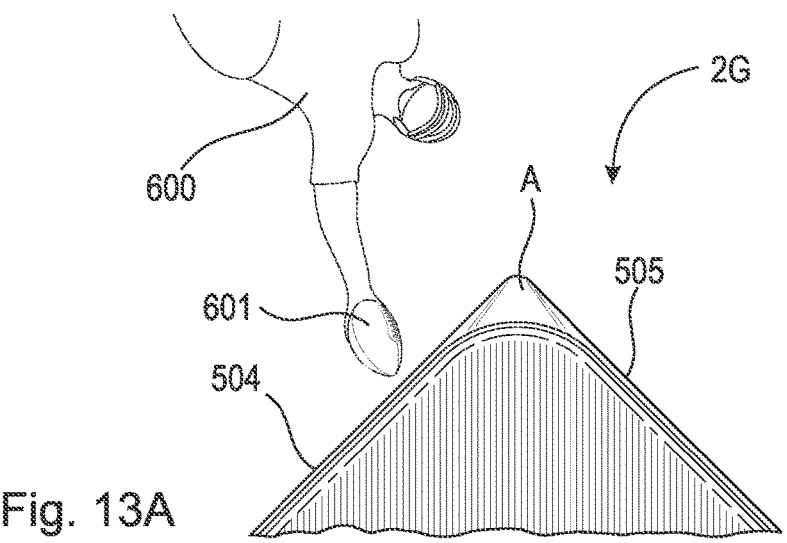
FIG. 13A is a representational display view of field of view 524.
Figure 13B:
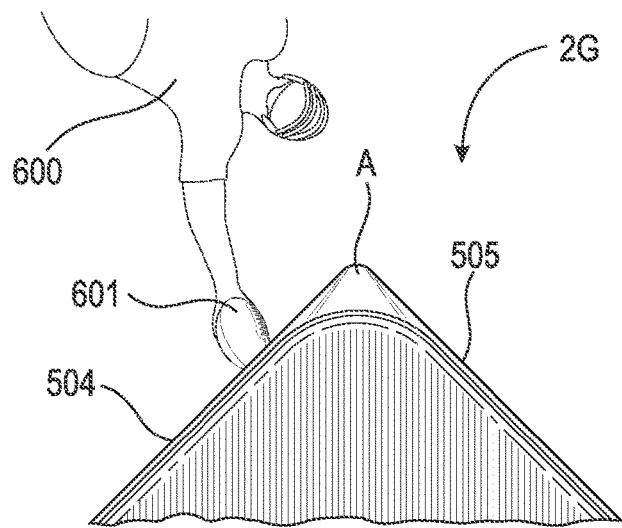
FIG. 13B is a representational display view of field of view 524.
Figure 13C:
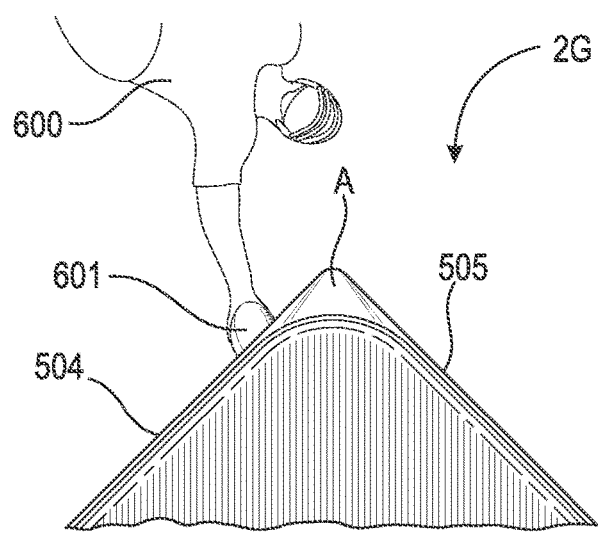
FIG. 13C is a representational display view of field of view 524.

FIGS. 13A, 13B, and 13C are similar views to those shown in FIGS. 12A, 12B and 12C, intended to illustrate sequential frames of video that an official may review during a football game. Cameras have frame rates which define the frequency at which consecutive images appear on a display.

In a preferred embodiment, the Marshall CV225-MB is used. This camera has a frame rate of 29.97 frames per second (fps). Thus, taking a display "frame-by-frame" will show a moving object in two different positions with higher frame rates having less difference between the two frames, and lower frame rates having more of a difference between the two frames. FIGS. 13A, 13B, and 13C represent a frame-by-frame display of field of view 524 as player 600 scores a touchdown during a game. In FIG. 13A, player 600 has not scored a touchdown yet as football 601 has not crossed the plane of goal line 400N. This is evident by football 601 being completely visible in field of view 524. In FIG. 13B, player 600 has scored a touchdown as football 601 has crossed the plane of goal line 400N which is evident as football 601 is partially "cut-off" from the display of field of view 524. In FIG. 13C, the touchdown scored by player 600 is even more obvious as he has traversed farther across the plane of goal line 400N which is evident as less of football 601 is visible in the display of field of view 524 compared to the display in FIG. 13B because more of football 601 is located directly above pylon-mounted camera assembly 2G.

Figure 14:
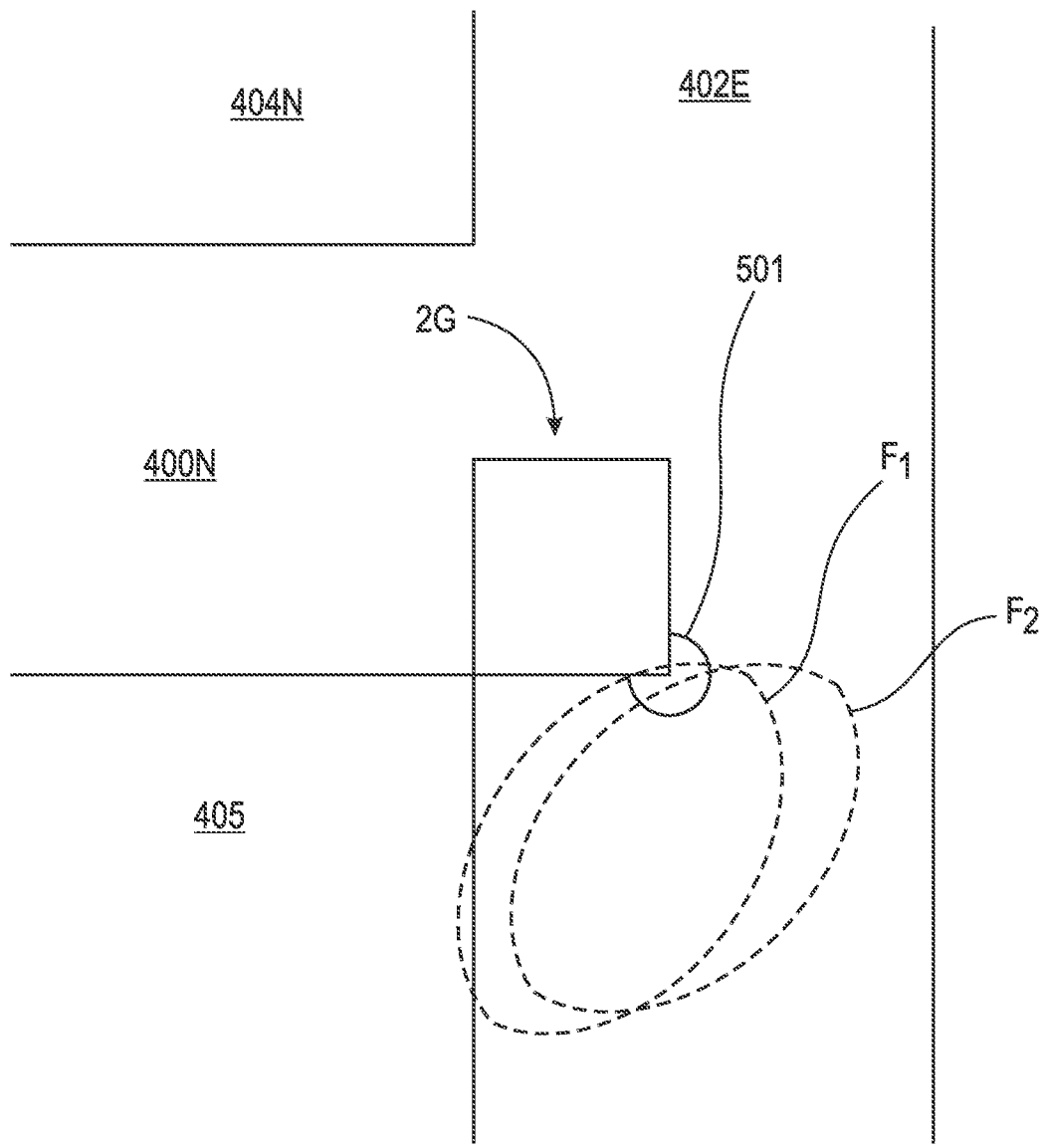
FIG. 14 is a top view of pylon-mounted camera assembly 2G as shown in FIG. 11; and, FIG. 15 is a perspective view of pylon-mounted camera assembly 2G as shown in FIG. 14 in use.

FIG. 14 is a top view of pylon-mounted camera assembly 2G in use during a football game. $F_1$ and $F_2$ represent football 601 in two different positions. The football at $F_1$ is in a scoring position according to NFL Rule 11 because a portion of the ball is located directly above pylon-mounted camera assembly 2G. Meanwhile, the football at position $F_2$ is not in a scoring position because it is not located directly over pylon-mounted camera assembly 2G.

Figure 15:
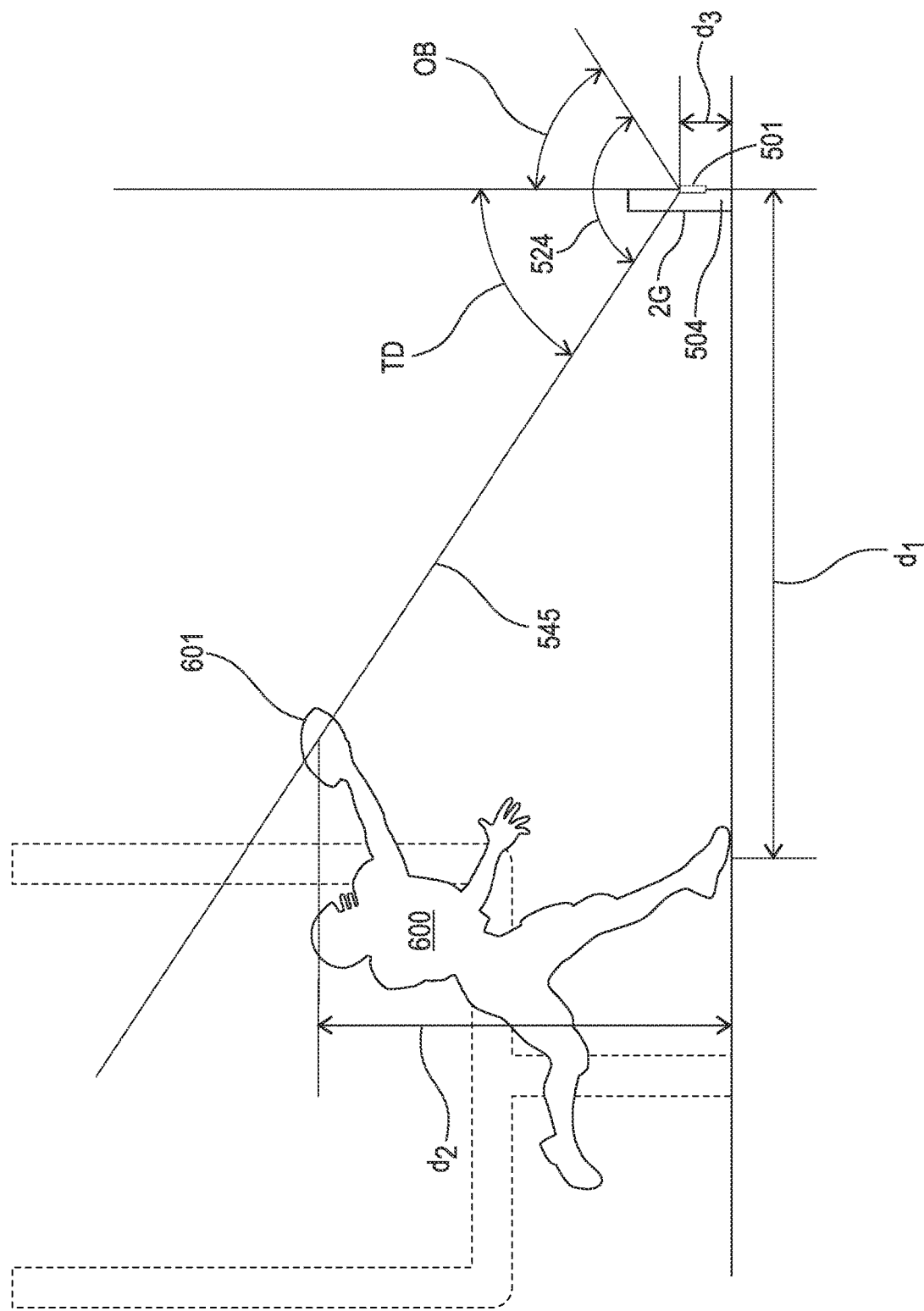
Figure 16:
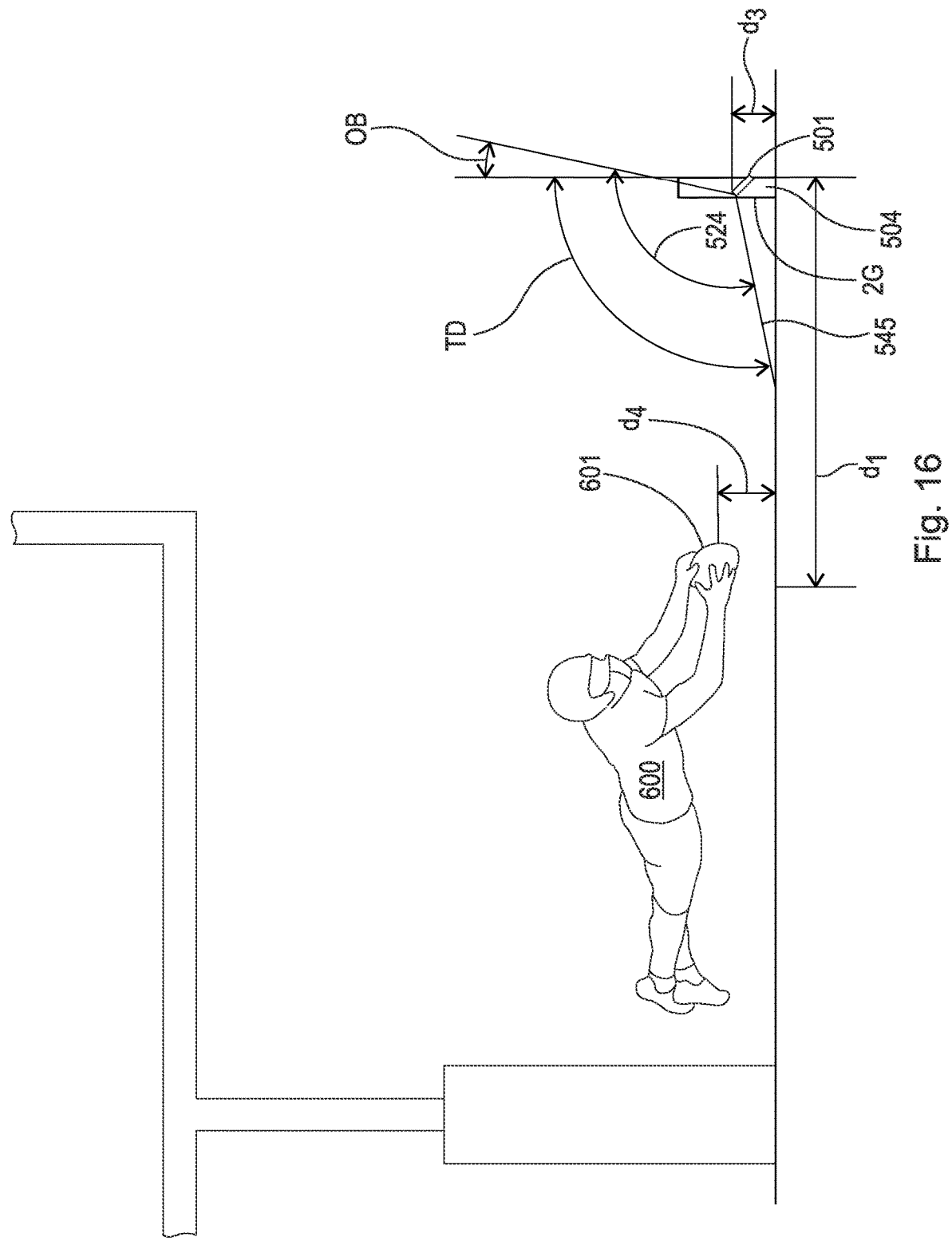
Figure 17:
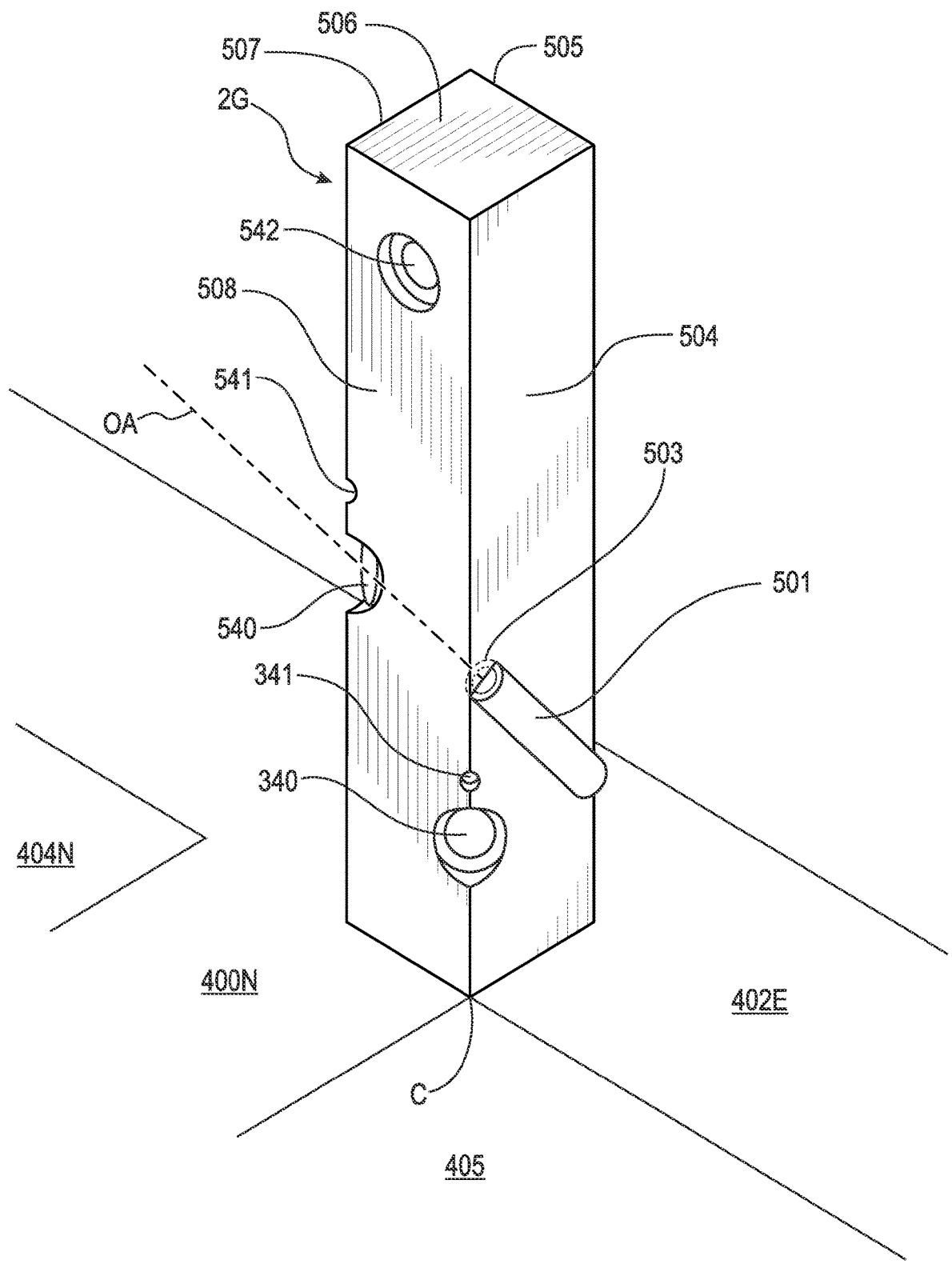
Figure 18A:
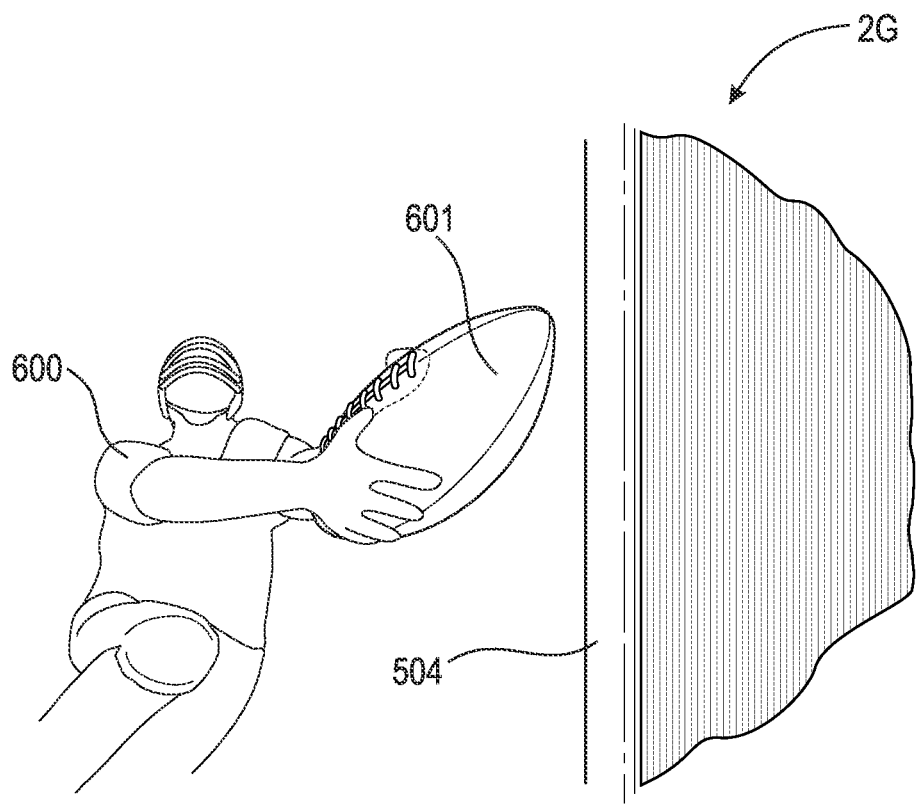
Figure 18B:
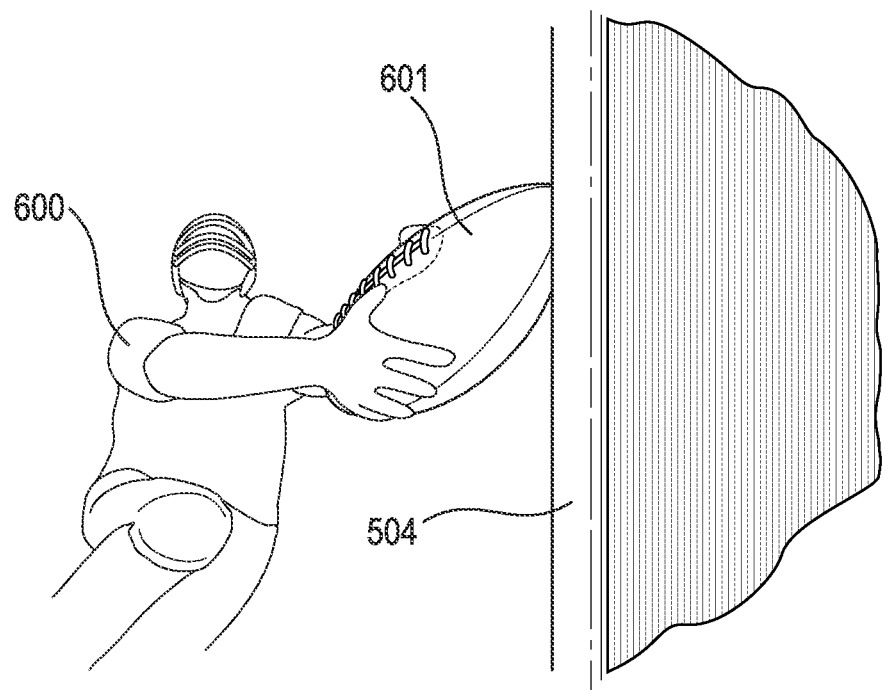

FIG. 15 is a front view illustrating player 600 running diagonally toward the goal line and pylon-mounted camera assembly 2G during a football game. Field of view 524 of camera 501 comprises touchdown portion TD and out of bounds portion OB. Line 545 defines the edge of field of view 524 that is located in the airspace substantially within field of play 405 (shown in FIG. 1) and endzone 404N (shown in FIGS. 1-4). Line 545 is co-planar with side face 504 and therefore the plane of goal line 400N (shown in FIGS. 2-4) such that, whenever a football (such as football 601) traverses line 545 (and it's associated plane) it should be considered a touchdown. Distance $d_1$ defines a distance from the player's foot to camera 501 and distance $d_2$ defines a distance from the ground surface to a portion of the football. The farther player 600 and football 601 are from camera 501 (distance $d_1$), the farther from the ground surface player 600 or football 601 (distance $d_2$) must be to be included in field of view 524, and more specifically touchdown portion TD. Camera 501 is positioned a distance $d_3$ from the ground surface on which pylon-mounted camera assembly 2G rests, which will affect the distances $d_1$ and $d_2$ that define field of view 524. As line 545 is co-planar to side face 504, camera 501 provides an extremely accurate determination of whether football 601 is in scoring position at the intersection of distances $d_1$ and $d_2$ along line 545. For example, in FIG. 15, football 601 has traversed the goal line and has entered touchdown portion TD and even though football 601 is not located in the airspace directly above pylon-mounted camera assembly 2G, an accurate determination whether the situation shown is a touchdown or not would be available.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

A First corner
B Second corner
C Corner
$D_{AB}$ Diagonal Axis
$F_1$ Position of football 601
$F_2$ Position of football 601
OA Optical Axis
$OA_1$ Optical Axis
$OA_2$ Optical Axis
θ Angle
T1 Section of top face 506 of pylon
T2 Section of top face 506 of pylon
TD Touchdown portion of field of view 524
OB Out of bounds portion of field of view 524
1a Section View
1H One yard hash mark
2H Two yard hash mark
3H Three yard hash mark
4H Four yard hash mark
5L Five yard line
10L Ten yard line
2 Pylon
2a Pylon
2G Pylon-mounted camera assembly
3a Cavity
3b Cavity
3d Cavity
3e Cavity
3f Cavity
4 Fan
5a Aperture
6 Fan flange
6a Fan flange
7 T-nut
8 Fan flange cover
8a Fan flange cover
9 Circular flange seat
10 Pylon-mounted camera assembly
11a Notch
11b Notch
12a T-bolt
12b Aperture
12c Aperture
12d Sleeve
13b Notch
14 Camera-flange cover
14a Camera-flange cover
15 Camera mounting sled
16 Recess
16a Weight
17a Wire conduit
17b Wire conduit
18 Pogo pin
20 Connector base
21n Magnet North pole
21s Magnet South pole
22 Magnet
22n Magnet North pole
22s Magnet South pole
23n Space for Magnet North Pole
23s Space for Magnet South Pole 24 Screw
25n Space for Magnet North Pole
25s Space for Magnet South Pole
26 Pad
28 Magnet
30 Pylon connector
34 Aperture
36 Aperture
40 Camera
42 Camera-flange
42a Camera-flange
43 Aperture
44 Housing
45 Camera lens
50 Camera sub-assembly
60 Fan sub-assembly
61 Foam cover
65 Cavity
66 Cavity
70 Diagrammatic circuit
72 Power supply/battery
74 Power cable
76 Transmitter
78 Fiber-optic cable
80 Cable
82 Receiver
84 Power supply/battery
86 Cable
88 Cable
90 Cable
92 Controller
94 Video recorder
98 Re-clocking distribution amplifier
101a Pod
101b Pod
102a Aperture
102b Aperture
103a Aperture
103b Aperture
104a Aperture
104b Aperture
105a Aperture
105b Aperture
106a Positioning lines
106b Positioning lines
107 Center section
108 Flange
109a Arm
109b Arm
110 Nail
111 Nail top
113a Tool
113b Tool
115 String
116 String
117 Label
118 Cylinder
119 Cavity
120a Pin
120b Aperture
121 Cap
122a Aperture
122b Aperture
122c Aperture
122d Aperture
123 Connector base
124 Pass-through cap
125 Washer
126 Plug
127 Plug
128a Cavity
128b Pin
129a Upper conduit section
129b Coupler
129c Lower conduit section
130a Aperture
130b Aperture
130c Aperture
130d Aperture
131a Fin
132 Flange
133 Conduit
134 Nut
135 Pylon-mounted camera assembly
136a Tapered section
136b Cavity
137a Flange
137b Conduit top surface
138a Threaded portion
138b Threaded portion
140 Field surface
150 Base mounting system
151 Plug sub-assembly
201 USB3 plug
202 Cable
203 USB3 receptacle
204 Cable
205 Insert
206a Aperture
206b Cable end
207a Notch
207b Notch
210 Self-sealing cap
211 Cap
212 Notch
213 Gasket
222e Aperture
235 Pylon-mounted camera assembly
302 Pylon
303a Aperture
303b Aperture
304 Fan
308 Fan cover
309 Seat
310 Pylon-mounted camera assembly
340 Camera
341 Microphone
344 Housing
345 Camera
350a Channel
351a Flange
351b Camera rear
353 Tube
354a Notch
355a Flange
355b Face
360 Camera mounting sled
400 Goal line
400N North goal line
400S South goal line
402 Sideline
402E East sideline
402W West sideline
403N North endline 403S South endline
404 Endzone
404N North endzone
404S South endzone
405 Field of play
406' Football field
410 Optical axis
412 Optical axis
414 Field of view
416 Field of view
420 Cavity
422 Field of View
501 Camera (vertically mounted)
503 Aperture
504 First side face of pylon
505 Second side face of pylon
506 Top face of pylon
507 Third side face of pylon
508 Fourth side face of pylon
510 Camera lens
511 Sensor
524 Field of View
525 Lens Guard
526 Barrel
527 Rim
530 Mount
531 Cylindrical member
532 Holder member
533 Connector member
534 Circuit board
535 Base
536 Nut
537 Cable
540 Camera
541 Microphone
542 Camera
545 Edge of field of view 524
600 Player
601 Football

What is claimed is:

1. A pylon-mounted camera assembly, comprising:
a pylon, said pylon comprising a first side face, a second side face, a third side face and a fourth side face, said first face adjacent to said second face such that said first and second side faces form a first corner, said third side face adjacent to said fourth side face such that said third and fourth side faces form a second corner, wherein a diagonal axis intersects said first and second corners;
a first aperture at least partially embedded within said first corner of said pylon; and,
a first camera positioned within said first aperture, said first camera facing upwardly, said first camera comprising an optical axis wherein said optical axis is arranged to intersect said diagonal axis of said pylon.

2. The pylon-mounted camera assembly of claim 1, wherein said first, second, third and fourth side faces are substantially perpendicular to a ground surface upon which the pylon rests.

3. The pylon-mounted camera assembly of claim 1, wherein the first camera is arranged about a first optical axis.

4. The pylon-mounted camera assembly of claim 1, wherein the first corner is chamfered or rounded.

5. The pylon-mounted camera assembly of claim 4, wherein the chamfer forms a surface between said first and second faces, and the first camera is mounted in said first aperture in the chamfered formed surface.

6. The pylon-mounted camera assembly of claim 1, wherein the first camera comprises a wide-angle lens.

7. The pylon-mounted camera assembly of claim 6, wherein the wide-angle lens comprises a first field of view where the first field of view is approximately 122 degrees.

8. The pylon-mounted camera assembly of claim 1, wherein the first face further comprises a second aperture and a second camera operatively arranged to be held within the second aperture.

9. The pylon-mounted camera assembly of claim 8, wherein the first camera and the second camera comprise a first telephoto lens and a second telephoto lens, respectively.

10. The pylon-mounted camera assembly of claim 1, wherein the first face comprises a plurality of apertures.

11. The pylon-mounted camera assembly of claim 1, wherein the first corner comprises a through-bore, wherein the through-bore is substantially defined by the first aperture.

12. The pylon-mounted camera assembly of claim 1, wherein the first face is substantially planar and the second face is substantially planar.

13. A pylon-mounted camera assembly, comprising:
a pylon, said pylon comprising a first side face, a second side face, a third side face and a fourth side face, said first face adjacent to said second face such that said first and second side faces form a first corner, said third side face adjacent to said fourth side face such that said third and fourth side faces form a second corner, wherein a diagonal axis intersects said first and second corners;
a first aperture positioned diagonally and at least partially embedded within said first side face of said pylon; and,
a first camera positioned at least partially in said aperture, said first camera angled toward the field of play, said first camera comprising an optical axis wherein said optical axis is arranged to be positioned substantially coincident to said first side face.

* * * * *